United States Patent [19]

Fassman

[11] Patent Number: 5,782,377
[45] Date of Patent: Jul. 21, 1998

[54] ARTICLE DISPENSING AND POSITIONING DEVICE

[76] Inventor: Arnold Fassman, 40 Oak St., Westport, Conn. 06880

[21] Appl. No.: 639,170

[22] Filed: Apr. 26, 1996

[51] Int. Cl.[6] ............................................. B65G 59/00
[52] U.S. Cl. ........................... 221/94; 221/93; 221/131; 221/8; 221/185; 221/115; 221/258; 221/275; 221/151; 414/797.9; 414/796.4
[58] Field of Search ........................ 221/92, 93, 94, 221/112, 115, 116, 131, 8, 155, 185, 238, 258, 268, 275, 151–150; 414/797.9, 796.4; 273/148 A; 446/2

[56] References Cited

U.S. PATENT DOCUMENTS

| | | | |
|---|---|---|---|
| 1,284,319 | 11/1918 | Grover | 221/115 |
| 1,637,710 | 8/1927 | Rider | 221/258 |
| 1,842,930 | 1/1932 | Bogoslowsky | 221/115 |
| 3,351,231 | 11/1967 | SHurtleff | 221/116 |
| 4,245,756 | 1/1981 | Burne et al. | 221/185 |
| 4,946,342 | 8/1990 | Fossman | 414/798.9 |

OTHER PUBLICATIONS

Photocopies of package in which motorized version of device disclosed in above listed document AA is currently marketed.

*Primary Examiner*—H. Grant Skaggs
*Attorney, Agent, or Firm*—Martin D. Wittstein

[57] ABSTRACT

An article dispensing and positioning device is disclosed in which a plurality of rectangular articles such as dominos or the like are placed on a flat surface in a plurality of parallel rows and in evenly spaced relationship with each other in each row. In one embodiment, the device includes a plurality of article dispensing assemblies mounted in a unitary housing which is capable of being propelled along the flat surface, preferably by motor mounted in the housing. In another embodiment, each article dispensing assembly is an integral unit, a plurality of which can be removably attached together to form a plurality of rows of dominos or the like. Each article dispensing assembly includes an ejector mounted therein for dispensing successive articles and an actuator for operating all of the ejectors, and means interconnecting all of the actuators for causing them to operate in a predetermined phase relationship in which the individual cycles of operation of each article dispensing assembly are uniformly out of phase with each other.

41 Claims, 10 Drawing Sheets

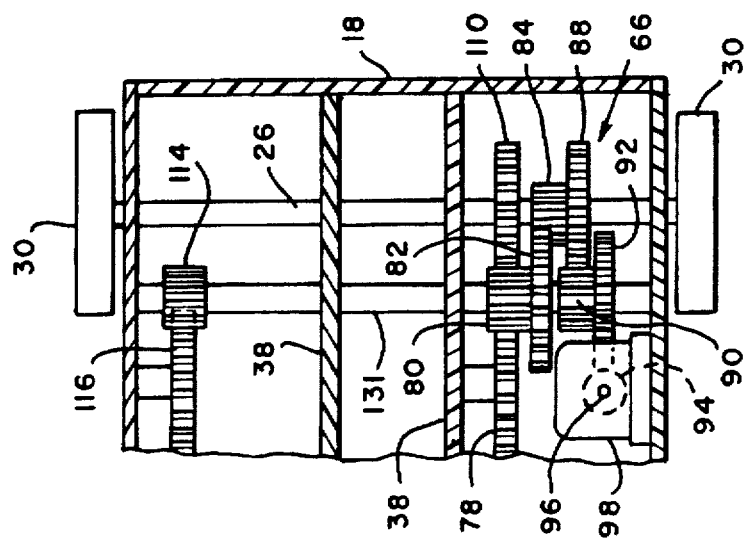
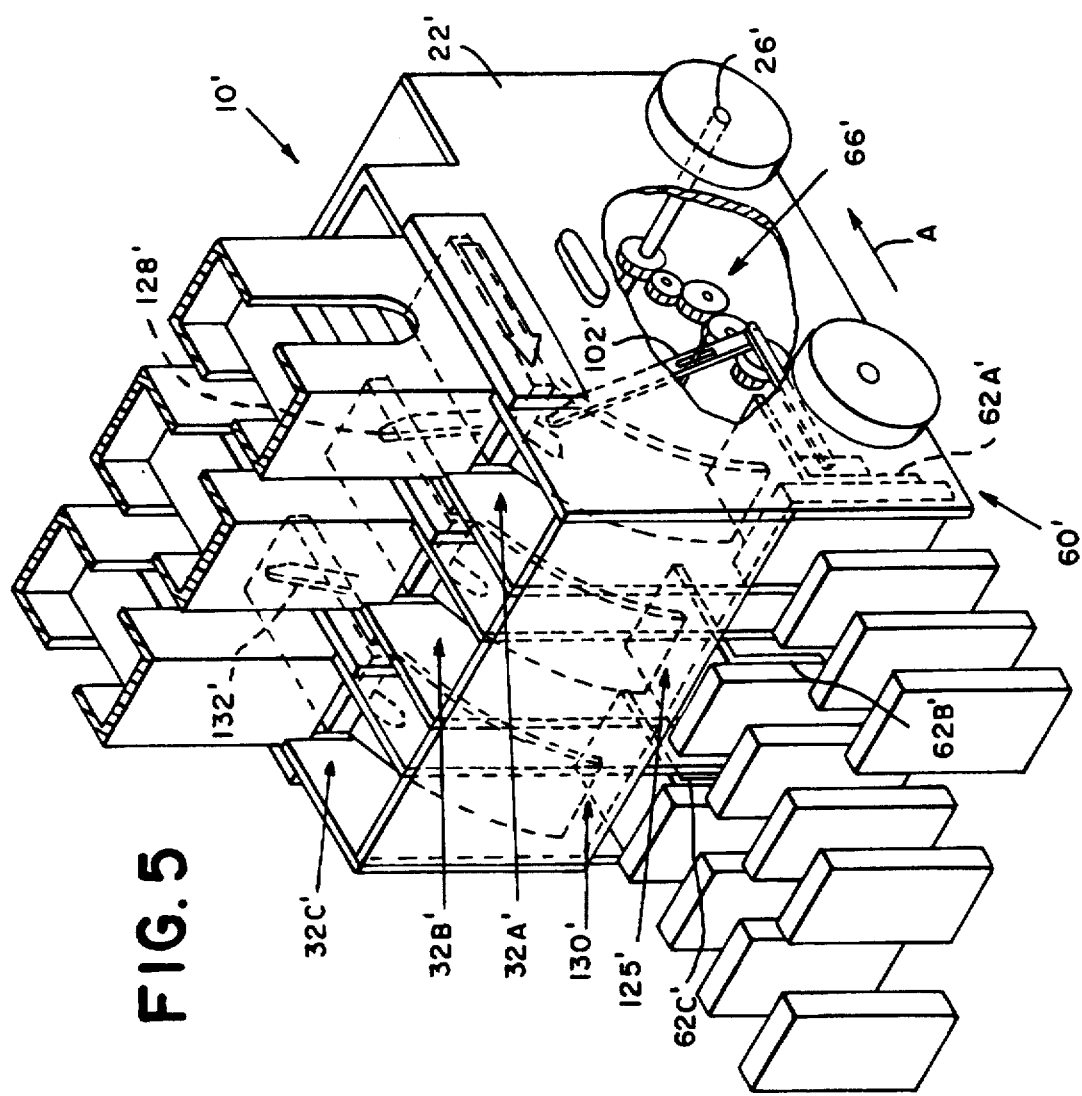

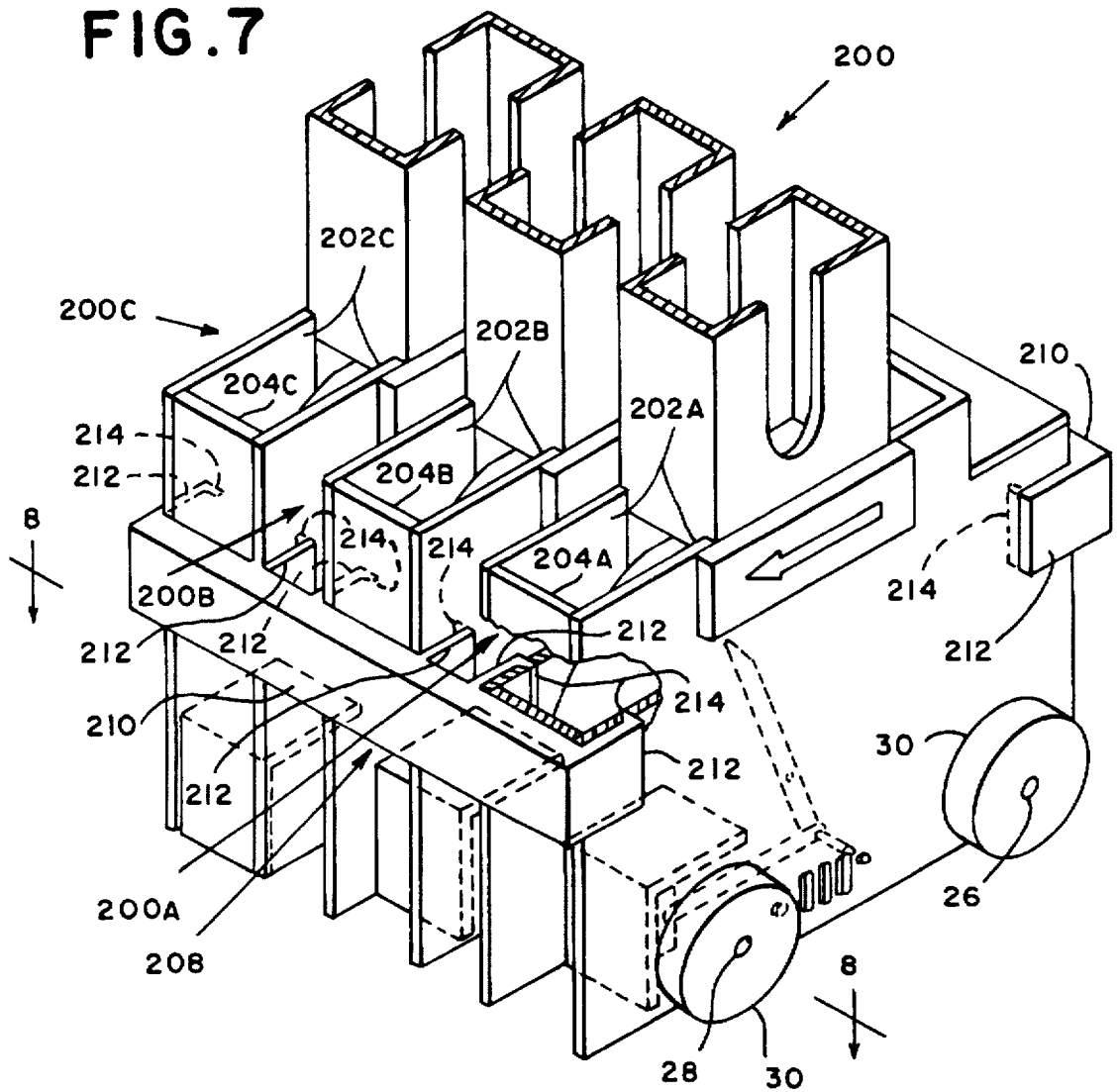

ARTICLE DISPENSING AND POSITIONING DEVICE

BACKGROUND OF THE INVENTION

The present invention relates generally to an article dispensing device, and more particularly to an article dispensing device for positioning a plurality of articles in a unique configuration on a supporting surface.

Most everyone is familiar with the recreational activity of setting up dominos in a row in closely spaced relationship, and then knocking them down by pushing over the first domino of the row which in turn pushes over the second, the third, and so one, until all of the dominos have fallen. In order to cause all of the dominos in the row to fall, it is necessary that they be spaced apart a distance such that each domino will cause the succeeding domino in the row to tip to the point where it will freely fall because the center of mass of the domino is moved beyond a point of upright stability. Thus, by so spacing the dominos, each one will push over the adjacent domino in the row and they all fall as in a continuous wave of falling dominos, much to the delight of both children and adults.

Over the past few decades, the pastime activity of setting up a few dozen dominos in a row and knocking them over has grown into a more mature sport of setting up many hundreds or even thousands of dominos in a rather complex pattern of rows, curves, crossovers, etc., such that each domino will still contact an adjacent domino and push it over regardless of the shape of the pattern which is set up. Some of these patterns, as occasionally seen on television, are so enormous and complex that tens of thousands of dominos are set up in patterns so intricate that it requires many days to set up the pattern and twenty to thirty minutes for all of the dominos to fall.

Without the benefit of any form of mechanical device to set up the dominos, it was necessary to set them up manually and to do so one domino at a time. It will be readily appreciated that it is a very time consuming process to set up complex patterns of hundreds or thousands of dominos for the reason that each domino is being set up on its short or least stable edge and therefore must be handled with great care in order to avoid inadvertently knocking over the domino while it is being set up. Obviously the consequence of inadvertently knocking over the domino is that the entire pattern will be prematurely knocked down. Also, considerable care and attention must be devoted to preventing the inadvertent knocking over of any domino already set up in the pattern, which will produce the same frustrating result. Parenthetically, the knockdown process can be aborted by removing a couple of dominos from the row at a location downstream from the point where they are falling, but even this must be done with great care or a new wave of falling dominos will commence. As briefly mentioned above, some of the extremely complicated patterns take several days to set up, even under carefully controlled environmental conditions, because of the time that is required to manually set up each domino on its short edge with the proper spacing from the adjacent domino and with sufficient stability to ensure that the domino will stay in the upright position when it is released from grasp.

Thus, there was at one time a significant need for a mechanical device which could set up dominos in a row in evenly spaced relationship, thereby eliminating the necessity for handling the dominos and avoiding risk of the frustrating results described above. Such a device was disclosed and claimed in U.S. Pat. No. 4,245,756, issued Jan. 20, 1991 to the inventor et al of the device disclosed in this application. That patent discloses an article dispensing and positioning device for placing a plurality of rectangular articles such as dominos or the like on a flat surface in a row in evenly spaced relationship with each other, the device comprising a body member and means such as wheels for supporting the body member for movement along a surface on which the articles are to be placed. A supply hopper is mounted on the body member for holding a plurality of articles. The body member includes a discharge chamber which is in communication with one end of the supply hopper such that articles in the supply hopper can move successively into the discharge chamber, which also includes a discharge opening through which articles are ejected and placed on the supporting surface. An ejector means is mounted in the body member for reciprocatory movement through the discharge chamber toward and away from the discharge opening such that the ejector means discharges an article from the discharge chamber during movement thereof toward the discharge opening, during which it also obstructs movement of the next adjacent article into the discharge chamber. The device further includes a means which is responsive to movement of the body member along the supporting surface for actuating the ejector means in its reciprocatory movement so that articles are successively dispensed and positioned on the surface.

Although the patented device worked well for the purpose intended, it suffered two distinct disadvantages, one being a limited capacity to eject and place articles on the supporting surface because of the constant need to reload the hopper, thereby requiring a long time to set up a pattern having a large number of articles. It was first thought that this problem could be solved merely by placing two or more of the patented devices side by side and moving them across the surface simultaneously, but this presented difficulties in maintaining alignment of the devices individually, with the result that the rows of articles from the plurality of devices could not be maintained parallel, and therefore there was no assurance that the articles would remain upright if one of the devices bumped into another. Also, it was almost certain that all of the dominos set up by one device would be prematurely knocked down if the other device should lag behind and bump into one of the dominos set by the first device. The other disadvantage of the patented device was that it had to be manually pushed across the supporting surface, which required that the person setting up the pattern be in close physical association with the dominos, thereby increasing the likelihood that the entire patterns could be prematurely knocked down.

A partial solution to these problems was realized through development of the device disclosed and claimed in U.S. Pat. No. 4,946,342, issued on Aug. 7, 1990 to the inventor of the device disclosed in this application. That patent discloses a device that is capable of setting up a plurality of parallel, laterally spaced rows of dominos by dispensing a plurality of dominos simultaneously, and which is motorized so that the person utilizing the device need not come into close contact with the dominos already set up. While this device effectively solved the problem of the user of the device avoiding close physical association with dominos already set up, it did little to speed up the domino set up process because the device could not set up dominos while in motion across the supporting surface. The construction and operation of this device is such that it is driven in an intermittent manner and can dispense and set up dominos only when it is not moving forward. Thus, the time advantage achieved by setting up two rows of dominos at the same time was neutralized by the device having to stop each time a pair of dominos was set up. Also, this device did not have a hopper for storing dominos, but rather merely dragged along a supply of dominos that already rested on the supporting surface, with the result that further time was consumed in constantly replacing the limited supply of dominos carried along by the device.

It was then thought that an effective solution to the problem of increasing the rate at which articles could be set up was simply to secure two or more motorized devices similar to the non-motorized device of the '756 patent together to make a composite unit. While this solved the problem of one device bumping into another or into the row of dominos set up by the other, it introduced still another problem, that of erratic operation of the composite unit because the independent driving means of each unit could not be maintained in a desired synchronous operation. Since they were powered by DC motors, which are sensitive to variations in resistance to movement, the composite unit could not be maintained in smooth and uniform operation, with the result that from time to time dominos would be inadvertently knocked over during the dispensing and set up portion of a cycle of operation, with the consequent undesirable results discussed above.

Thus, there is a need for an article dispensing and positioning device of the type under consideration which will dispense and position domino like articles in a plurality of parallel rows and in evenly spaced relationship in each row, and which operates sufficiently smoothly and effectively to ensure that the articles are always dispensed and set up with sufficient stability so that they remain upright. There is also a need for an article dispensing and positioning device which will set up any desired number of parallel rows of dominos simultaneously, and which is made up of a plurality of removably attached individual dispensing assemblies.

BRIEF SUMMARY OF THE INVENTION

The present invention at least obviates if not entirely eliminates the disadvantages of the prior known domino ejecting and positioning devices by providing a device which meets the foregoing requirements. In its broader aspects, the principles of the invention are embodied in an article dispensing and positioning device which places a plurality of rectangular articles such as dominos or the like on a flat surface in a plurality of parallel rows and in evenly spaced relationship with each other in each row. In this environment, the device comprises a plurality of article dispensing assemblies, each of which includes means for holding an article to be dispensed therein, an ejector means movably mounted within the dispensing assembly for cyclical reciprocative movement therein, and actuator means in the dispensing assembly for causing the cyclical operation of the ejector means to eject an article from the dispensing assembly with each cycle of operation of said ejector means. The actuator means of each of the dispensing assemblies is adjusted to operate in a predetermined phase relationship in which the individual cycles of operation of each of the ejector means is uniformly out of phase with each other ejector means. There are means operatively associated with the dispensing assemblies for securing them together to form a composite unit, which includes means for supporting the composite unit for movement along the flat surface on which the articles are to be placed. Finally, the device includes means operatively interconnecting the dispensing assemblies for maintaining the operation of all of the actuator means in the aforementioned predetermined phase relationship to maintain the operation of all of the ejector means in the uniformly out of phase relationship with each other, whereby variations in the force required to operate the article dispensing and positioning device resulting from resistance to movement of the operating parts of the article dispensing assemblies are substantially reduced or eliminated.

In one principal embodiment of the invention, the means for securing the dispensing assemblies together to form the composite unit comprises a plurality of side and end walls defining a generally rectangular and upstanding housing, the dispensing assemblies being fixedly mounted in the housing in side by side relationship with each other so that a plurality of parallel rows of evenly spaced articles are set up as the article dispensing and positioning device moves across said surface. In another principal embodiment, the means for securing the dispensing assemblies together for form the composite unit comprises means for removably securing a variable number of individual and self contained dispensing assemblies together in the same side by side relationship with each other as in the first embodiment. Thus, in this embodiment of the invention, the article dispensing and positioning device may be assembled by the user to include a variable number of removably connected dispensing assemblies, depending on the number of rows of articles that the user desires to set up at a given time.

With respect to either embodiment, the article dispensing and positioning device theoretically may have any number of article dispensing assemblies mounted in the housing or removably secured together, as the case may be, providing sufficient power is available to move the device and actuate the ejector means mounted in each article dispensing assembly. As a practical matter, however, it has been found that 2, 3 or 4 article dispensing assemblies mounted side by side in the housing or removably secured together constitute a conveniently workable toy. Thus, the invention contemplates that if there are two article dispensing assemblies, the predetermined phase relationship of operation of the cycles of operation thereof would be 180° out of phase; if there are three article dispensing assemblies, the predetermined phase relationship of operation of the cycles of operation thereof would be 120° out of phase; and if there are four article dispensing assemblies, the predetermined phase relationship of operation of the cycles of operation thereof would be 90° out of phase.

In some of the more limited aspects of the invention, in the first embodiment which utilizes a single housing for the dispensing assemblies, the means for supporting the composite unit includes a single means for supporting that housing for movement along the flat surface. In the second embodiment, which utilizes a plurality of individual dispensing assemblies that can be removably secured together to form the composite unit, the means for supporting the composite unit includes individual means for supporting each of the dispensing assemblies so that they can be moved along the flat surface even when not secured together.

In both embodiments of the invention, the means operatively interconnecting all of the dispensing assemblies to maintain the predetermined phase relationship operation comprises a means operatively interconnected between the actuator means of all of the dispensing assemblies. This means may be through a single shaft interconnecting all of the actuator means through suitable gear means and which is also connected to the supporting means so that operation of the shaft both operates the actuator means of all of the dispensing assemblies and also rotates the shaft to propel the composite unit along the flat surface. Alternatively, to more efficiently drive the unit, separate shafts may be included, one of which is interconnected with the actuator means of all of the dispensing assemblies, the other of which is connected only to the supporting means for propelling the unit along the flat surface.

Again in both forms of the invention, a power means is provided, typically in the form of a small battery powered DC motor, which is connected to the actuator means in one of the dispensing assemblies. In the first embodiment, the power means is simply mounted in the housing and connected to one of the actuator means. In the second embodiment, each individual dispensing assembly can be marketed as a powered unit with a motor mounted therein, or as a dummy unit without a motor, so that once a user has purchased a powered unit, he can thereafter purchase one or more dummy units to attach to the powered unit.

In the event that a user purchases more than one powered dispensing assembly and wishes to join them together to form a composite unit of two or more powered dispensing assemblies, each dispensing assembly is provided with means for disconnecting the motor from the actuator means within the dispensing assembly, so that a composite unit of any number of dispensing assemblies can be driven from only one powered dispensing assembly. This eliminates the possibility of erratic operation of the composite unit which would result from variations in the force imposed on the individual actuator means of the dispensing assemblies if the motor remained connected to all of the actuator means.

A significant feature of the second embodiment of the invention is that all of the dispensing assemblies are removably connected together by suitable means which permits them to be readily disconnected so that the user can quickly and easily select the number of dispensing assemblies he desires to use at a given time, depending on the number of rows of articles he wishes to set up. Thus, each dispensing assembly includes a housing, and various forms of connecting means are provided for removably securing together some portion of the housing of each of the dispensing assemblies so that they are secured together in spaced apart side by side relationship with each other.

Another significant feature of this embodiment of the invention is that the means for connecting the actuator means of all of the dispensing assemblies so as to maintain the predetermined phase relationship operation thereof comprises means that is operatively but removably interconnected between all of the actuator means. Preferably this is accomplished by providing means removably and adjustably interconnecting the supporting means of all of the dispensing assemblies. Typically, the supporting means comprises wheels attached to the individual housings of the dispensing assemblies, and various forms of connecting means are provided for removably and adjustably connecting together adjacent wheels of adjacent dispensing assemblies in such a manner that the predetermined phase relationship operation of all of the actuator means can be maintained.

Having briefly described the general nature of the present invention, it is a principal object thereof to provide an article dispensing and positioning device having the capability of placing a plurality of rectangular articles such as dominos or the like on a flat surface in a plurality of parallel rows and in evenly spaced relationship with each other in each row.

It is another object of the present invention to provide an article dispensing and positioning device in which variations in the force required to operate the article dispensing and positioning device resulting from resistance to movement of various operating parts of the device are substantially reduced or eliminated.

It is still another object of the present invention to provide an article dispensing and positioning device which accomplishes the foregoing object by providing a plurality of article dispensing assemblies, each of which operates to dispense a rectangular article such as a domino or the like, the article dispensing assemblies operating in a predetermined phase relationship in which the individual cycles of operation of each article dispensing assembly are uniformly out of phase with each other.

It is a further object of the present invention to provide an article dispensing and positioning device composite unit which is powered by a single power means, such as a DC motor, which is operatively connected to only one article dispensing assembly actuator means in the composite unit regardless of the number of such dispensing assemblies provided in the composite unit.

It is a still further object of the present invention to provide an article dispensing and positioning device in which a composite unit comprised of a plurality of individual article dispensing assemblies, each of which has a power means therein which can be disconnected from the actuator means so that only a single power means remains operable to power the composite unit.

Another object of the present invention is to provide an article dispensing and positioning device in which a plurality of article dispensing assemblies can be removably and adjustably connected together so that a user can select the number of dispensing assemblies to connect together depending on the number of rows of articles he wishes to set up.

Yet another object of the present invention is to provide an article dispensing and positioning device in which a composite unit of dispensing assemblies is made up of a plurality of dispensing assemblies each of which has means for removably and adjustably interconnecting the actuator means of each dispensing assembly so as to maintain the predetermined phase relationship operation of the plurality of actuator means regardless of the number of dispensing assemblies making up the composite unit.

These and other objects and advantages of the present invention will become more apparent from an understanding of the following detailed description of presently preferred embodiments of the present invention when considered in conjunction with the accompanying drawings.

DESCRIPTION OF THE DRAWINGS

FIG. 5 is a view similar to FIG. 1 but showing an alternate embodiment of the invention which utilizes three article dispensing assemblies rather than two as shown in FIG. 1.

FIG. 6 is a fragmentary sectional view of the forward end of the device as shown in FIG. 4 showing an alternate form of the mechanism for transferring the drive from one dispensing assembly to another.

FIG. 7 is a perspective view similar to FIGS. 1 and 5 showing another embodiment of the invention in which plural dispensing assemblies, each with their own housings, are removably secured together by one form of connecting means to form a composite unit.

DETAILED DESCRIPTION OF THE INVENTION

Figure 1:
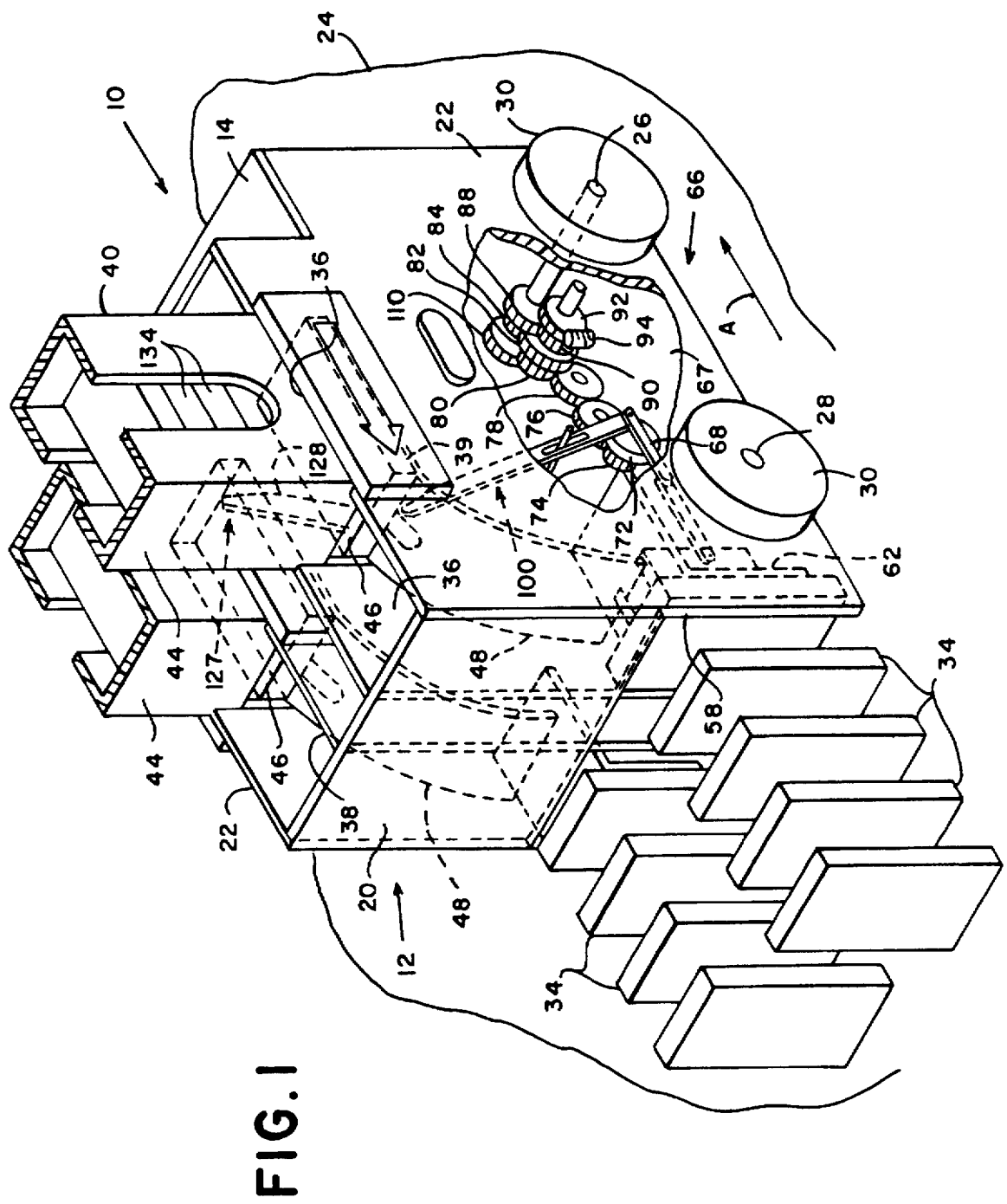
FIG. 1 is a perspective view of one embodiment an article dispensing device incorporating the principles of the present invention in which plural article dispensing assemblies are incorporated into a unitary housing to form a composite unit, with a portion of the side wall of the housing broken away to reveal internal detail.

Referring now to FIGS. 1 through 6 of the drawings, which illustrate one embodiment of the invention, and with reference particularly to FIGS. 1 through 4, the article dispensing and positioning device of the present invention is indicated generally by the reference numeral 10, and is seen to comprise a generally rectangular housing forming a composite unit, indicated generally by the reference numeral 12, which includes a relatively short top wall 14, a bottom wall 16 (FIG. 2) and a front wall 18 (FIG. 2), a rear wall 20 and opposed side walls 22. A means for supporting the housing 12 for movement along a supporting surface 24 is mounted on the side walls 22, and includes an axle 26 disposed adjacent the front 18 and another axle 28 disposed adjacent the rear wall 20, both axles 26 and 28 extending slightly beyond the side walls 22 so that wheels 30 can be mounted thereon. The device 10 is propelled in the direction of the arrow A during normal operation so that parts facing in this direction are designated as being forward. It should be noted at this point that, in the form of the device disclosed in this application, the front axle 26 is powered in a manner hereinafter fully described, to drive the wheels 30 mounted thereon so that the device 10 is self propelled with the rear axle 28 being freely rotatably mounted. However, it is contemplated within the scope of the invention that both axles 26 and 28 may be freely rotatably mounted so that the device 10 must be manually pushed along the supporting surface 24, as in the manner of the device disclosed in the above referenced U.S. Pat. No. 4,245,756, since the principles of the present invention are applicable to both forms of the article dispensing and positioning device.

In the embodiment of the invention shown in FIGS. 1 through 4, a pair of article dispensing assemblies, indicated generally by the reference numerals 32A and 32B (FIG. 4), are suitably mounted in the housing 12 in spaced apart relationship such that elongate articles 34, such as dominos or any similar form of elongate articles, can be dispensed and placed in upright position on the short edge of the articles in a side by side relationship corresponding generally to the spaced apart relationship of the dispensing assemblies 32. Since the dispensing assemblies 32A and 32B are identical except for the differences specifically noted below, reference will be made initially only to the dispensing assembly 32A.

Thus, it will be seen that the article dispensing assembly 32A includes an upwardly opening receptacle 36 which is defined by an upper portion of the rear wall 20, a longitudinally offset upwardly extending flange 37 (FIG. 2), an upper portion of the side wall 22 and an intermediate wall 38 extending between the front and rear walls 18 and 20 in spaced relationship with the side wall 22, and a bottom wall 39 which extends laterally between the side wall 22 and the intermediate wall 38 and longitudinally from the flange 37 to a location in spaced relationship with the rear wall 20. The receptacle 36 is adapted to receive the lower end of an article storage hopper 40 in vertically oriented relationship, the hopper 40 containing a plurality of articles 34 which are normally disposed in a horizontal orientation within the hopper 40 so that the hopper 40 stores a relatively large number of articles 34 depending on the length thereof. It should be noted that, although the drawings show a separate hopper 40 for each article dispensing assembly 32A and 32B, it is possible to provide, and therefore within the scope of the invention, a single hopper mounted intermediate the two article dispensing assemblies, with suitable means to dispense articles alternately to each of the article dispensing assemblies 32A and 32B. The hopper 40 has suitable retaining means for preventing articles 34 from falling out of the bottom while it is being inserted into the receptacle 36, and one side wall 44 has a lateral opening 46 adjacent the bottom edge thereof through which articles 34 are ejected successively by a mechanism described below. It should be understood that, although two intermediate walls 38 are shown, one for each dispensing assembly 32A and 32B, the device 10 can be constructed with only one intermediate wall 38 which is shared by both dispensing assemblies.

Figure 2:
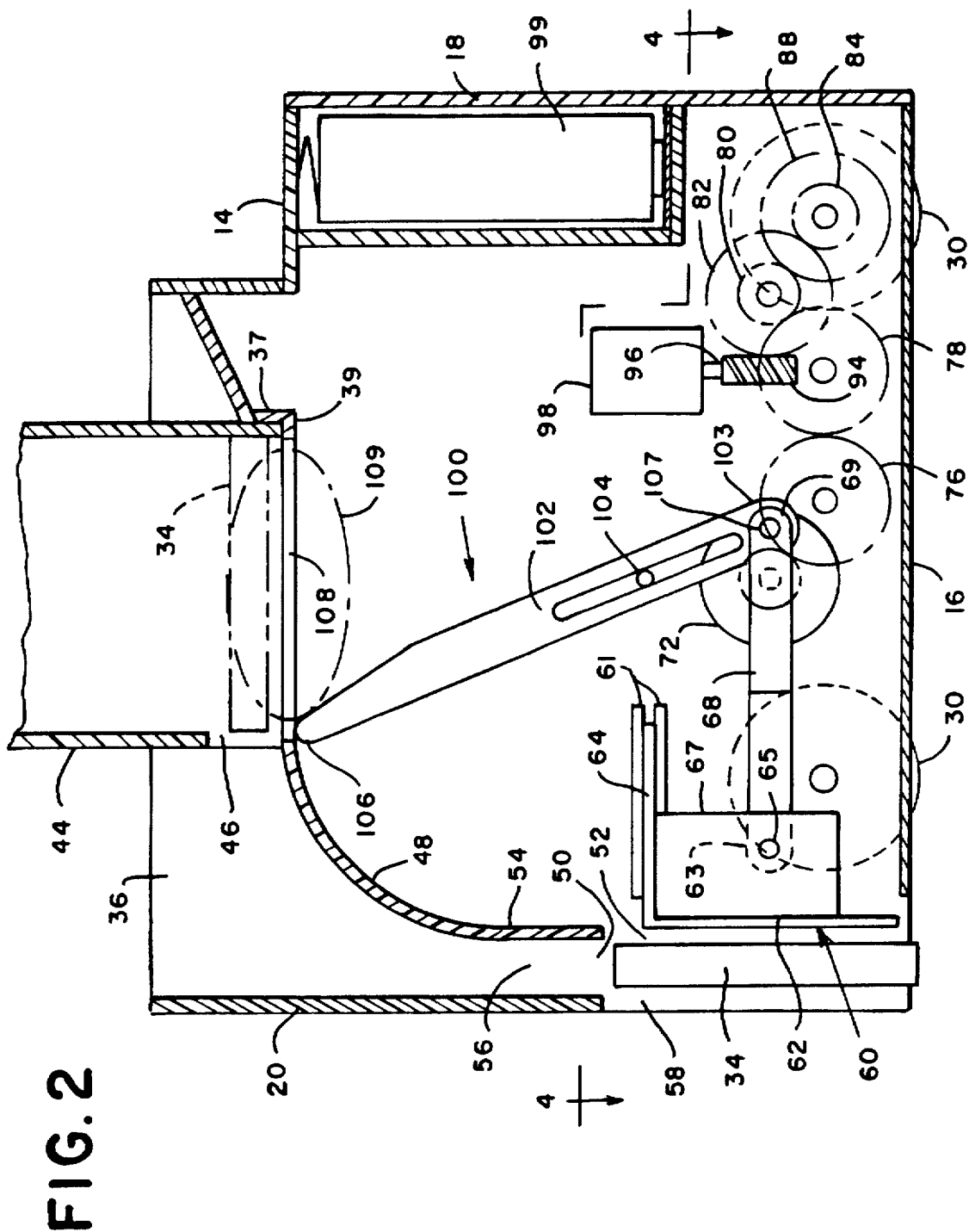
FIG. 2 is a side view of the device shown in FIG. 1 with the side wall removed to reveal internal detail.
Figure 3:
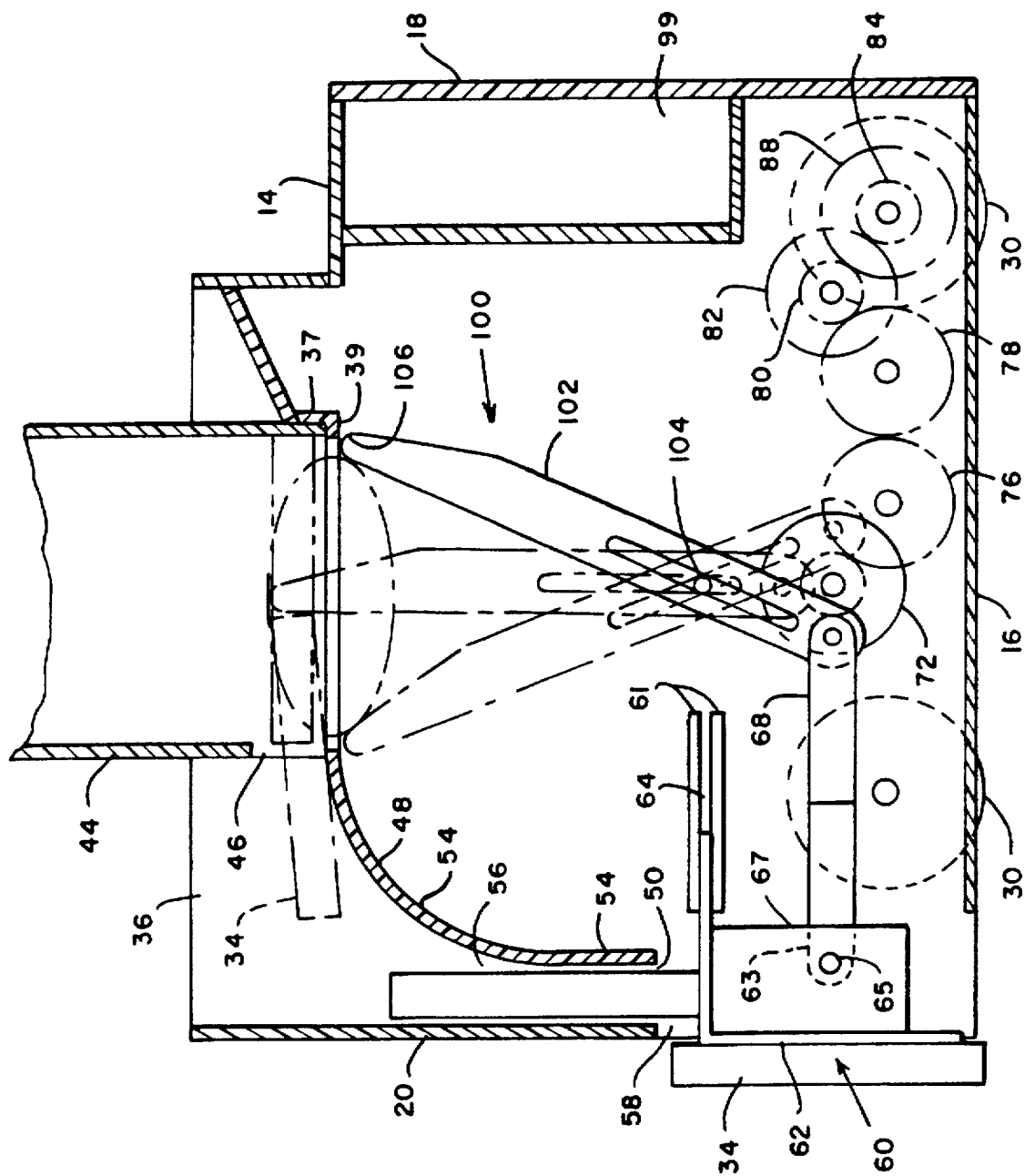
FIG. 3 is a side view similar to FIG. 2, but with the operating parts of the device is a different position from that shown in FIG. 2.

As best seen in FIGS. 2 and 3, the housing 12 includes means defining a discharge chamber which receives articles 34 from the hopper 40 and from which they are ejected and positioned in upright orientation on the supporting surface 24. Thus, the bottom wall 39 of the receptacle 36 is provided with a rearwardly and downwardly extending curved portion 48 which extends generally from the lateral opening 46 in the hopper 40 downwardly to an opening 50 adjacent the upper end of an article discharge chamber 52, which is defined by lower portions of the side wall 22 and intermediate wall 38. The lower end portion 54 of the curved portion 48 of the bottom wall 39 and the rear wall 20 of the housing 12 form a vertically oriented channel 56 through which articles 34 ejected from the lateral opening 46 of the hopper 40 enter the discharge chamber 50. The rear wall 20 of the housing 12 includes a rearward facing opening 58 through which an article 34 is ejected from the discharge chamber 52 in a manner hereinafter described.

An ejector means, indicated generally by the reference numeral 60, is mounted in the discharge chamber 52 for cyclical reciprocative movement therein toward and away from the rearward facing opening 58 such that the ejector means 60 ejects an article 34 from the discharge chamber 52 during movement thereof toward the opening 58. Thus, it will be seen that the ejector means 60 includes a vertically oriented rear wall 62 which abuts the adjacent face of an article 34 in the discharge chamber 52 and pushes the article 34 out of the discharge chamber 52 through the opening 58 when the ejector means 60 moves toward the rear wall 20. The ejector means 60 also includes a horizontally oriented upper wall 64 which is connected to the upper end of the rear wall 62 and which moves across the lower end of the channel 56 (FIG. 3) during the aforementioned movement of the ejector means 60, the upper wall 64 being guided for linear reciprocative movement by a pair of guide rails 61 suitably affixed to the side wall 22 and the intermediate wall 38. The upper wall 64 thus prevents an article 34 from prematurely entering the discharge chamber 52 through the opening 50 until the rear wall 62 of the ejector means 60 is substantially at the forward end of its reciprocative movement (FIG. 2).

Figure 4:
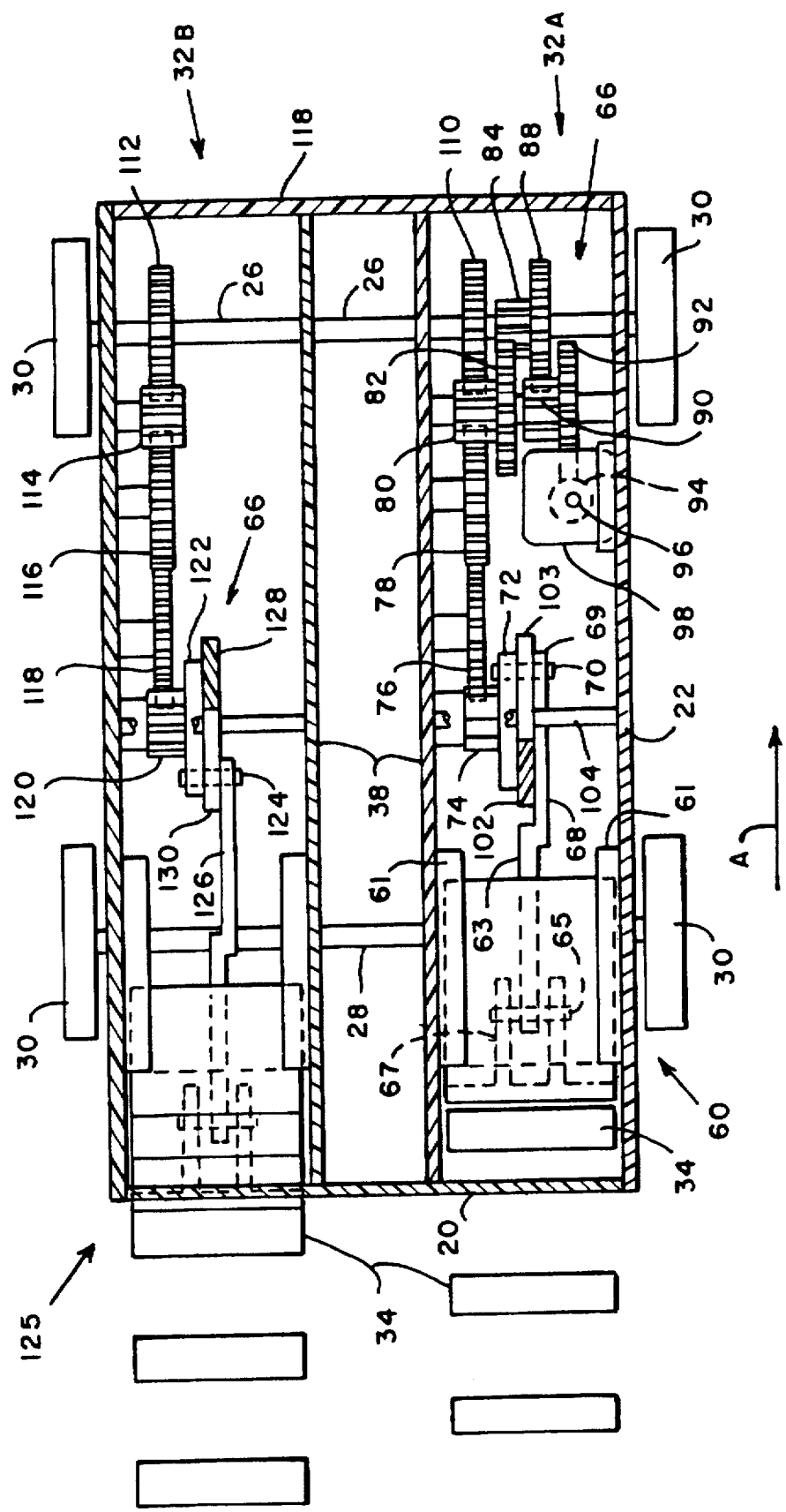
FIG. 4 is a sectional view taken on the line 4—4 of FIG. 2.

The article dispensing and positioning device 10 further includes an actuator means, indicated generally by the reference numeral 66, for causing the ejector means 60 of the article dispensing assembly 32A, as well as the ejector means of other article dispensing assemblies hereinafter described, to move through the aforementioned cyclical reciprocative movement in the discharge chamber 52. Thus, as best seen in FIGS. 2, 3 and 4, the ejector means 60 includes an arm 68, the rearward end 63 of which is pivotally connected to a pin 65 mounted on a pair of ribs 67 suitably connected to the rear wall 62 and the upper wall 64 of the ejector means 60. The forward end 69 of the arm 68 is connected to a pin 70 which is eccentrically mounted on a disc 72 which in turn is rotatably mounted on the intermediate wall 38. The disc 72 includes a small coaxial pinion 74 fixed to the disc 72 for rotation therewith and which meshes with a gear 76 which in turn meshes with still another gear 78, both of which are rotatably mounted on the intermediate wall 38. The gear 78 meshes with still another small pinion 80 that is rotatably mounted on the intermediate wall 38 and is coaxially fixed to another gear 82 for rotation therewith. The gear 82 meshes with another pinion 84 which is rotatably mounted on axle 26 and is fixed to a gear 88 for rotation therewith. The gear 88 meshes with a pinion 90 which is rotatably mounted coaxially with the gear 82, the pinion 90 being fixed to a gear 92 for rotation therewith which meshes with a worm gear 94 mounted on the drive shaft 96 of a motor 98 which is suitably mounted within the housing 12.

Thus, it will be seen that when the motor 98 is energized by closing a suitable circuit between the motor 98 and a battery 99 (FIG. 2), rotation of the drive shaft 96 and the worm gear 94 causes the gear 92 and the pinion 90 to rotate, the pinion 90 thereby rotating the gear 88 and the pinion 84, which in turn rotates the gear 82 and the pinion 80 to rotate the gears 78 and 76. This series of gears provides a large speed reduction between the gear 92 driven by the worm gear 94 and the gear 78. The gear 76 rotates the pinion 74 and the disc 72, thereby moving the pin 70 in an orbital path about the axis of the disc 70. This orbital movement of the pin 70 causes the forward end 69 of the ejector arm 68 that is connected to the pin 70 to move in the same orbital path, which in turn causes the rearward end 63 of the ejector arm 68 that is connected to the ejector means 60 to move in a reciprocative path, which thereby moves the ejector means 60 in the reciprocative path within the discharge chamber 52 because of the upper wall 64 of the ejector means 60 is constrained to move in the reciprocative path by the guide rails 61.

In order to eject articles 34 from the lower end of the hopper 40 in the embodiment of the invention shown in FIGS. 1 through 4, the device 10 is provided with a discharge assistant, indicated generally by the reference numeral 100, which ejects articles 34 one at a time from the receptacle 36 so that they can slide down the curved portion 48 of the bottom wall 39 toward the discharge chamber 52. Thus, an elongate arm 102 is pivotally mounted on a stub shaft 104 suitably affixed to the intermediate wall 38 above the location of the disc 72, with the lower end 103 of the arm 102 being rotatably connected to the same pin 70 on the disc 72 as is in the forward end 69 of the ejector arm 68. The upper end of the arm 102 is preferably tapered or otherwise configured to form a narrow tip 106 which, during movement as described below, projects through an elongate slot 108 in the bottom wall 39 of the receptacle 36. The arm 102 moves in a translatory motion about the stub shaft 104 as the disc 72 rotates, and since the upper portion of the arm 102 from the stub shaft 104 to the tip 106 is longer than the lower portion of the arm 102 from the stub shaft 104 to the pin 72, the circular orbital path of the pin 72 causes the tip 106 to move in an elongate asymmetric oval shaped orbital path as indicated by the dash line 109 shown in FIG. 2. When viewed in FIG. 3, this path first causes the tip 106 to project upwardly through the slot 108, then move rearwardly toward the curved portion 48 of the bottom wall 39, during which the tip 106 engages the forward edge of the article 34 in the receptacle 39 and pushes the article rearward through the lateral opening 46 in the hopper side wall 44 toward the curved portion 48 of the bottom wall 39. The tip 106 then moved downwardly until it is below the bottom wall 39 in the receptacle 36, as seen in FIG. 2, so that the next article 34 in the hopper 40 can moved downward into the receptacle 36, and the tip 106 then moves forwardly beneath the bottom wall 39 to return to the starting position shown in FIG. 3.

As briefly stated above, the article dispensing device 10 according to the embodiment of the invention shown in the drawings are preferably self propelled, and the embodiment shown in FIGS. 1 through 6 is driven preferably by the same motor 98 that drives the ejector means 60 and the discharge assistant 100. Thus, with reference again to FIG. 4, it will be seen that the pinion 80 which drives the gear 78 as described above to move the ejector means 60 and the discharge assistant 100 also meshes with a gear 110 which is fixedly mounted on the axle 26 so that rotation of the pinion 80 also rotates the axle 26. The axle 26 rotates the wheels 30 to propel the device 10 across the surface 24 at a relatively slow rate of speed.

It has been previously mentioned that a significant feature of the present invention is that there are a plurality of article dispensing assemblies, of which the embodiment of the invention shown in FIGS. 1 through 4 includes only two. The article dispensing assembly 32A has been previously described as the powered unit since it includes the motor 98 and all the necessary gearing to drive the ejector assembly 60, the discharge assistant 100 and the axle 26. However, it is not only not necessary for both assemblies to be powered, it is disadvantageous to power both assemblies because this would introduce a synchronization problem between the separate power sources. Thus, as best seen in FIG. 4, the drive for the ejector means and the discharge assistant of the article dispensing assembly 32B is taken directly from the axle 26, with the result that the motor 98 in the article dispensing assembly 32A becomes the power source for both assemblies.

The axle 26 is a single unit that extends through both article dispensing assemblies 32A and 32B, and a gear 112 is fixedly mounted on the axle 26 in the assembly 32B which corresponds to the gear 110 in the assembly 32A. The gear 112 meshes with a pinion 114 rotatably mounted on the side wall 22, which in turn meshes with a gear 116 which meshes with another gear 118, the pinion 114 corresponding to the pinion 80 in the assembly 32A and the gears 116 and 118 corresponding to the gears 78 and 76 respectively in the assembly 32A. The gear 118 meshes with another pinion 120 which is fixed to a disc 122 having a pin 124 eccentrically mounted thereon, the gear 118, disc 122 and pin 124 corresponding exactly to the gear 74, disc 72 and pin 70 of the article dispensing assembly 32A. The article dispensing assembly 32B has an ejector means, indicated generally by the reference numeral 125 which has an actuator arm 126, the forward end 128 of which is connected to the pin 124. The article dispensing assembly 32B also has a discharge assistant having an elongate arm 128, the lower end 130 of which is connected to the pin 124. Thus, it should now be apparent that during operation, the motor 98 drives the axle 26 as previously described, and rotation of the axle 26 causes operation of the ejector means 124 and the discharge assistant arm 130 through the gears 112, 114, 116, 118 and 120, and the disc 122 and pin 124 in exactly the same manner as was described above in connection with the corresponding parts in the article dispensing assembly 32A.

Another significant feature of the present invention is that the article dispensing assemblies 32A and 32B are synchronized to operate in cycles which are diametrically opposite to each other, i.e., their cycles of operation are 180° out of phase in order to substantially, if not completely, eliminate variations in the load imposed on the motor 98 due to varying degrees of resistance to movement of the moving parts of the device, particularly the ejector means 60 and the discharge assistant 100. An inherent characteristic of DC motors, especially low voltage motors, is that they are quite sensitive to variations in load imposed on the motors from variations in the resistance to movement of the instrumentality being driven, which causes such a motor to run at varying speeds, the greater the load the slower the speed. If the variations in load in a given situation are sufficiently great, the motor is subject to very erratic operation, including stopping altogether, thereby causing the instrumentality being driven to operate in a correspondingly erratic manner. While this type of operation may be acceptable in certain situations, it is not acceptable in connection with the device of the present invention because of the nature of setting up the dominos or other similar articles on their short edges. It should be apparent that when the device 10 is dispensing and setting up the articles 34, they are resting on the supporting surface 24 as soon as they drop down the channel 56 and enter the discharge chamber 58, and it is quite critical at this point that the ejector means 60 operate as smoothly as possible in ejecting the article 34 therefrom in order to ensure that the article 34 is not inadvertently pushed over by a sudden, even though momentary, push from the ejector means 60. Also, it is equally important that the forward motion of the device 10 be as uniform as possible, since erratic movement of the device 10 can also have an adverse effect on the movement of the ejector means 60 relative to the article 34 in the discharge chamber 52.

In order to fully understand the advantages of the out of phase relationship of the operation of the article dispensing assemblies, it is necessary to understand the varying degrees of resistance to movement of the operating parts thereof. Thus, it will be seen in FIG. 3 that the arm 102, as briefly mentioned above, is disposed in a forward slanting orientation in which the tip 106 is at the forward end of the slot 108. At the same time, the rear wall 62 of the ejector means 60 is in its rearward most position, having just ejected an article 34 from the discharge chamber 52. As the disc 70 rotates in a clockwise direction as seen in FIG. 3, the pin 70 simultaneously pushes upwardly on the arm 102 to cause the top 106 to pass through the forward end of the slot 108 and engage the forward facing edge of the lower most article 34 in the hopper 40. At the same time, the pin 70 pulls the actuator arm 68 forwardly which pulls the ejector means 60 in the same direction to retract the article engaging face 62 of the ejector means 60 back into the discharge chamber 52. As the disc 72 continues to rotate, the tip 106 of the arm 102 follows the dash line path designated 109 to push the lower most article 34 out of the lateral opening 46 at the bottom of the side wall 44 of the hopper 40, as indicated by the vertically oriented position of the arm 102 shown in phantom lines and the partially extended article 34 shown in FIG. 3. At this point the disc 72 has rotated approximately 90°, and as the rotation continues the arm 102 moves to the rearward slanting position shown in phantom lines in FIG. 3 and in solid lines in FIG. 2, in which the arm 102 has been pulled downwardly to bring the tip 106 back through the slot 108 to a position below the wall 39. Since, as seen in FIG. 2, the ejector means 60 has been fully retracted to its forward position in which the upper wall 64 does not close off the bottom of the channel 56, the article 34, which has been pushed far enough onto the curved portion 48 to cause it to fall by gravity, slides down through the channel 56 and into the discharge chamber 52. At this point the disc 72 has rotated approximately 180° from the solid line position of FIG. 3 to the solid line position of FIG. 2. During the remainder of the cycle, the pin 70 now oscillates the arm 102 in the opposite direction to bring the tip 106 back to forward or starting position shown in solid lines in FIG. 3 along the lower portion of the dash line path 109, and it pushes the actuator arm 68 rearward to cause the ejector means 60 to push the article 34 out of the discharge chamber 52.

It may appear that the ejector means 60 does not actually eject an article 34 from the discharge chamber 52 because the device 10 moves forwardly at the same speed that the ejector means 60 moves rearward, with the result that there is no relative motion between the article 34 and the supporting surface. This, however, is not necessarily so for two reasons. Firstly, the gearing that drives the ejector means 60 and the discharge assistant 100 on the one hand and the wheels 30 on the other may not be sufficiently accurate (it being remembered that these are merely molded plastic parts for use in a toy) to cause the rear wall 62 to move rearward at precisely the same speed that the device 10 is moving forwardly. Also, and perhaps of greater significance, is the fact that the ejector means 60 is moving rearward with harmonic motion rather than uniform motion due to the connection of the forward end 103 of the actuator arm 68 with the orbiting pin 70, with the result that the actuator arm 68 increases in velocity as the pin 70 moves through the 90° from the starting position shown in solid lines in FIG. 3, and decreases in velocity as the pin 70 moves through the next 90° to the position shown in solid lines in FIG. 2. The same sequence of movement occurs during the remaining 180° of rotation of the disc 72 during which the ejector means 60 moves in the opposite direction. Thus, since the device 10 ideally moves forwardly at a uniform velocity and the ejector means 60 moves rearwardly at a varying velocity, there is a portion of this movement in which the ejector means 60 is actually pushing the article 34 out of the discharge chamber 52, which causes it to have some degree of relative movement with respect to the supporting surface 24. It should be apparent that it is essential to have as smooth operation of the ejector means 60 as possible during this period of relative movement.

Referring back to FIGS. 2 and 3, it should now be apparent that the greatest resistance to movement of the moving parts heretofore described occurs when the disc 72 rotates through the first 90° arc to move the pin 70 clockwise so as to move the tip 106 of the arm 102 upwardly to commence pushing the lower most article 34 out of the hopper 40 to move it to approximately the half ejected position shown in phantom lines in FIG. 3. The reasons for this are two-fold, firstly that the arm 102 must overcome the friction between the upper surface of the lower most article 34 in the hopper and the lower surface of the adjacent article. which of course will be greatest when the hopper 40 is full and will diminish as the supply of articles 34 in the hopper is depleted. Secondly, during this 90° rotation of the disc 72 to move the arm 102 from the solid line starting position to the vertical phantom line position, the pin 70 is pushing upwardly on the arm 102. thereby lifting its weight. Thus. the force required to perform both of these operations simultaneously will exert an increased load on the motor 98 which, as explained above. causes it to run at a slower speed. During the next 90° of rotation, the pin 70 is pulling downwardly on the arm 102, which requires less force than to raise it, so that even though the article 34 is only half ejected from the hopper 40, the force required to eject it further is less than was required to move it to the half ejected position. However, at this half way point, the force of the pin 70 on the lower end of the arm 102 is perpendicular to the longitudinal axis of the arm 102. thereby requiring the greatest amount of torque on the pin 70 to move the arm 102, so that the force required to move the tip 106 toward and beyond the midpoint of its travel remains substantially constant.

It should be noted that during these two 90° segments of rotation of the disc 72, the force required to move the ejector means 60 in the forward direction from the FIG. 3 position to the FIG. 2 position is very slight since it is merely being retracted back into the discharge chamber. During the next 180° rotation of the disc 72, the movement of the arm 102 back to the starting position requires very little force since there is virtually no resistance. However, some degree of force is required to move the ejector means 60 rearwardly to push the article 34 that was just ejected from the hopper 40 out of the discharge chamber 52. Also, the varying torque effect of the pin 70 on the forward end 69 of the actuator arm 68 further increases the force required to move the ejector means rearwardly, although not as much as that required to move the lowermost article 34 out of the hopper 40.

Thus, it is seen that the degree of force required to operate a single article dispensing device 32 through a complete cycle of operation is not uniform, but rather varies considerably from one portion of the cycle to another and if the cycles of operation of the ejector means and the discharge assistant of both dispensing assemblies 32A and 32B were synchronized to be in phase with each other, the combined forces resulting from such operation would be sufficient to cause very erratic operation of the article dispensing device 10, with the consequent disadvantageous and unacceptable results fully explained above. This problem is overcome in the present invention by the above described diametrical phase relationship of the operation of the discharge assistant and ejector means of each of the article dispensing assemblies so that, to the fullest extent possible, the load surges imposed by the operating parts of each assembly are neutralized by the corresponding load surges of the other, thereby resulting in a fairly consistent composite load imposed on the motor and consequent uniform and smooth operation of the device 10. This is accomplished by adjusting the actuating mechanisms 66 of each of the dispensing assemblies 32A and 32B to that they are 180° out of phase.

This condition exists when the ejector means 60 of the assembly 32A is at one end of the cycle, such as being fully retracted to its forward most position within the dispensing chamber 52, as seen in FIG. 1, and the ejector means 125 of the assembly 32B is at the other end of the cycle, such as being fully extended to its rearward most position in the dispensing chamber 52, also as seen in FIG. 1. These positions can also be seen in FIG. 4, albeit that in this figure each ejector means is at the opposite end of the cycle from the position shown in FIG. 1. It is also seen in FIG. 1 that when the ejector means 60 of the assembly 32A is in its forward most position, the arm 102 of the discharge assistant 100 is in the rearwardly inclined position shown in FIG. 2, while at the same time when the ejector means 60 of the assembly 32B is in its rearward most position, the arm 128 of the discharge assistant 127 is in the forwardly inclined position shown in solid lines in FIG. 3. Thus, by this arrangement, the actuating means 66 of each of the dispensing assemblies 32A and 32B are adjusted to operate in a predetermined phase relationship in which the individual cycles of operation of the ejector means 66 of both dispensing assemblies are uniformly out of phase with each other. Also, the axle 26 constitutes the means operatively interconnecting the actuator means 66 in each of the dispensing assemblies 32A and 32B for maintaining the operation of both actuator means 66 in the predetermined phase relationship to maintain the operation of both ejector means 60 and 125 in the same uniformly out of phase relationship. The result is that variations in the force required to operate the article dispensing assemblies 32A and 32B resulting from resistance to movement of the operating parts of the assemblies are substantially reduced or eliminated.

FIG. 5 illustrates another embodiment of the present invention in there are three article dispensing assemblies 32A, 32B and 32C incorporated into a single article dispensing device designated generally by the reference numeral 10'. Since all of the internal operating parts of each article dispensing assembly of this embodiment are identical to those already described, no further description or showing of these parts is believed necessary for a complete understanding of this embodiment except for the following specific changes.

Firstly, as a matter of practical convenience, not absolute necessity, the driving motor for the device 10' would be located in the middle assembly 32B, with the drive to the outer assemblies 32A and 32C being through the axle 26' in the same manner as that already described in connection with driving the assembly 32B from the motor 98 located in the assembly 32A. Thus, the actuator means, designated generally by the reference numeral 66', seen through the broken away portion of the side wall 22' in the dispensing assembly 32A in FIG. 5 is identical to the actuator means seen in the dispensing assembly 32B in FIG. 4. Obviously in this embodiment a motor would have to be provided having sufficient power to handle the increased load from a third article dispensing assembly.

Further, with three article dispensing assemblies, it will be understood that the actuator means 60' of the three article dispensing assemblies 32A, 32B and 32C would have to be adjusted so that the predetermined phase relationship is 120° apart in order for the individual cycles of operation of each of the ejector means 60', 125' and 130' are still uniformly out of phase with each other. As with the previous embodiment, this phase relationship can be seen in FIG. 5 by comparing the relative positions of the vertical walls 62A', 62B' and 62C' of the ejector means 60' of each of the dispensing assemblies 32A', 32b' and 32C' respectively, wherein the walls 62A' and 62C' are disposed at opposite ends of their reciprocative movement, whereas the wall 62B' is disposed in a central position between the opposite ends. Similarly, it will be seen that the arms 102', and 132' of the discharge assistants for the dispensing assemblies 32A' and 32C' are disposed at opposite ends of their oscillatory movement, whereas the arms 128' is disposed in a central position between the opposite ends. It is believed apparent from the previous discussion that a 120° predetermined phase relationship will produce the maximum degree of uniform load imposed on the motor in the middle dispensing assembly 32B from the load variations imposed by the ejector means and discharge assistants of the three article dispensing assemblies.

It should be noted that further variations in the invention are possible regarding the number of article dispensing assemblies that can be incorporated into a single device. For example, it is within the scope of the invention to provide four article dispensing assemblies, with a single motor located in one of the inner units, with the predetermined phase relationship of the ejector means and the actuator means of each of the dispensing assemblies being 90° out of phase with the other assemblies. Thus, any number of article dispensing assemblies can be assembled into a single device providing a sufficiently large power source is provided.

FIG. 6 illustrates a variation in the means interconnecting the actuator means of each of the dispensing assemblies regardless of the number thereof. For the sake of simplicity, this variation is shown in conjunction with the article dispensing assembly 32A as seen in FIG. 2. Thus, it will be seen that the short stub shaft on which the pinion 80 and gear 82 are mounted in the article dispensing assembly 32A is now formed as a continuous shaft 131 which extends through the intermediate wall 38 of the article dispensing assembly 32A, through the corresponding intermediate wall of the article dispensing assembly 32B and extends sufficiently far into the article dispensing assembly 32B to have the pinion 114 mounted thereon. Thus, with this arrangement, the pinion 114 is driven directly from the pinion 80 without going through the gear 110, the axle 26 and the gear 112, as in the variation shown in FIG. 4. The advantage of this arrangement is that less power is required to operate the ejector assembly 124 and the discharge assistant arm 128 of the article dispensing assembly 32B because the transfer of drive from the pinion 114 to the gear 116 provides a mechanical advantage since a small gear is driving a larger gear. In the arrangement shown in FIG. 4, however, there is a mechanical disadvantage between the gear 112 on the axle 26 and the pinion 114 because a large gear is driving a smaller gear.

Figure 8:
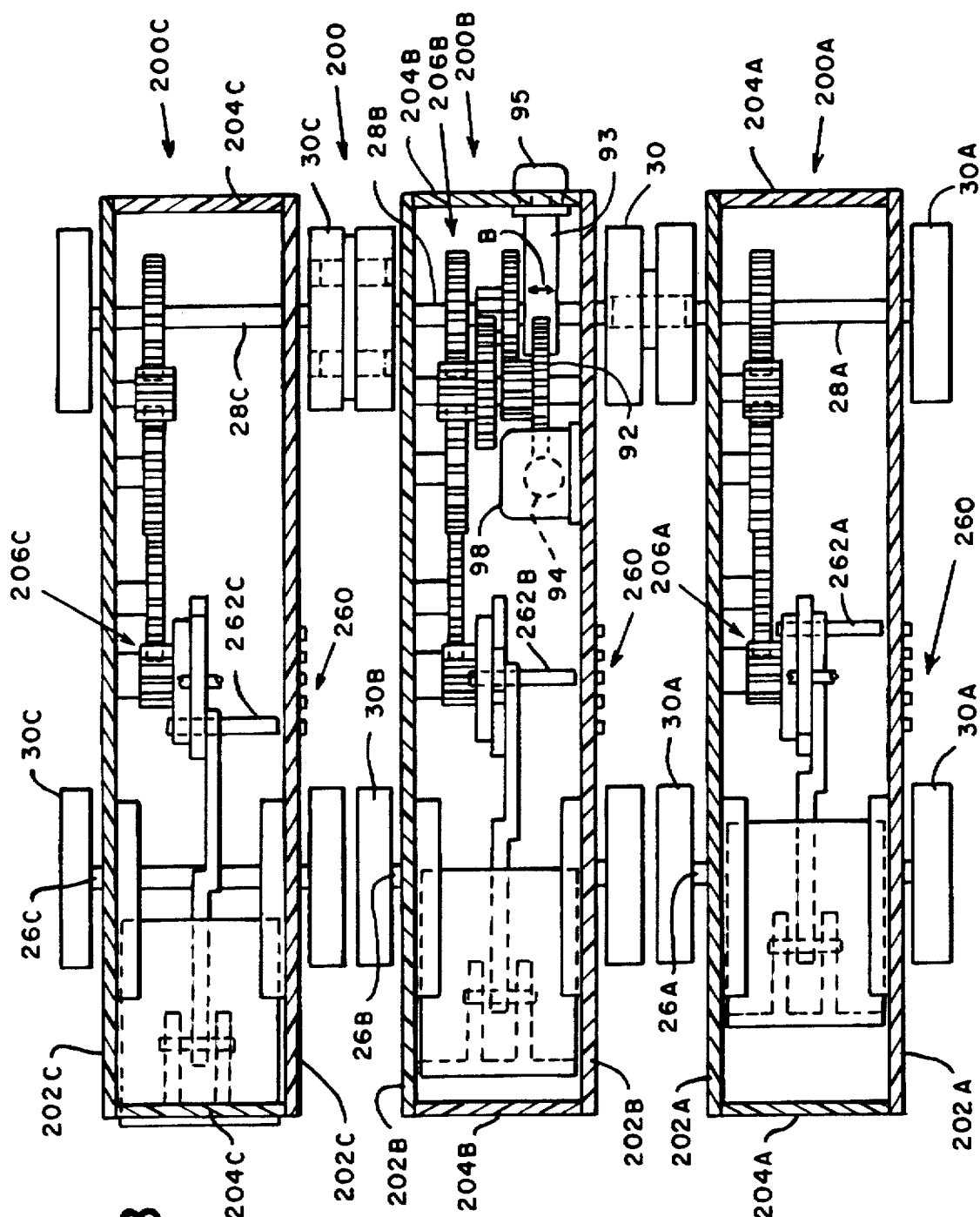
FIG. 8 is a sectional view similar to FIG. 4 taken on the line 8—8 of FIG. 7.

FIGS. 7 through 13 illustrate several modifications another embodiment of the invention in which a plurality of individual and self contained article dispensing assemblies are removably secured together to form a composite unit. As best seen in FIGS. 7 and 8, the composite unit, designated generally by the reference numeral 200, is composed of a plurality of individual article dispensing assemblies, designated generally by the reference numerals 200A, 200B and 200C. As with the previous embodiment in which the composite unit 10 or 10' contained a plurality of article dispensing assemblies of varying number, the composite unit 200 of this embodiment may be made up of different numbers of dispensing assemblies, recognizing as with the previous embodiment that four such assemblies represents a practical limit for the device. It should also be understood, as with the previous embodiment, that normally all of the dispensing assemblies are identical with the exception that one assembly will be powered while the remaining assemblies will not be powered and will be driven in the manner hereinafter described from the powered assembly. It should be noted at this point, as described in further detail hereinbelow, that it is possible to join together two or more powered assemblies in which the power source can be disconnected from the actuator means so that effectively only one dispensing assembly functions as a powered unit.

Each of the assemblies 200A, 200B and 200C is composed of individual generally elongate and upstanding housings formed by opposed side walls 202A, 202B and 202C and opposed end walls 204A, 204B and 204C, the housings being general similar in configuration to the individual article dispensing assemblies 32A, 32B and 32C of the previous embodiment. As best seen in FIG. 8, each assembly 200A, 200B and 200C includes from and rear axles 26A, 26B and 26C and 28A, 28B and 28C respectively, on which are mounted wheels 30A, 30B and 30C for supporting each of the dispensing assembly for movement along a surface. Each dispensing assembly 200A, 200B and 200C includes an actuator means designated generally as 206A, 206B and 206C respectively, the actuator means 206A and 206C being identical to that seen in FIG. 4 for the dispensing assembly 32B, while the actuator means 206B for the dispensing assembly 200B is identical to the actuator means 66 of the dispensing assembly 32A, thereby designating the dispensing assembly 200B as the powered assembly while the other dispensing assemblies are non-powered assemblies. As a practical matter, the article dispensing assembly 200B could be marketed as a stand alone toy, or one or more non-powered dispensing assemblies could be packaged with it. Non-powered article dispensing assemblies could also be packaged individually so that they would be available as later add ons to the powered unit. Thus, the principles of this embodiment of the invention apply to a composite unit containing at least one powered assembly and any number of non-powered assemblies. It is believed that further description of the actuator means and the ejector means of the individual dispensing assemblies is not necessary for a complete understanding of the invention except as specifically noted below. Again it should be noted, as further explained hereinbelow, that plural powered assemblies can be utilized together where there is means for disconnecting the power source from the actuator means in all but one assembly.

FIGS. 7 and 9 through 11 show three different variations of the means for removably securing a plurality of the dispensing assemblies together to form the composite unit 200. Thus, with reference to FIG. 9, it will be seen that an elongate latching clip, designated generally by the reference numeral 208, includes an elongate body member 210 which extends for the width of a predetermined number of article dispensing assemblies, such as three in the case of the device shown in FIG. 9. A plurality of pairs of latching fingers 212 extend laterally for a relatively short distance from the side of the body member 210 facing the rearward end walls 204A, 204B and 204C, with the latching fingers of each pair being spaced from each other by approximately the width of the dispensing assemblies between the side walls 202A, 202B and 202C, as the case may be, and the pairs of latching fingers being spaced from each other by the space between adjacent side walls of adjacent dispensing assemblies. All of the latching fingers 212 terminate in inwardly turned hook portions 214 which are adapted to snap into a suitably receptor means such as slots formed in the side walls 202A, 202B and 202C adjacent at least one end and preferably both end walls 204A, 204B and 204C. The hook portions are slightly chamfered on one side to facilitate easy removal of the latching clip 208 when it is desired to separate one or more of the article dispensing assemblies from the composite unit 200.

Figure 9:
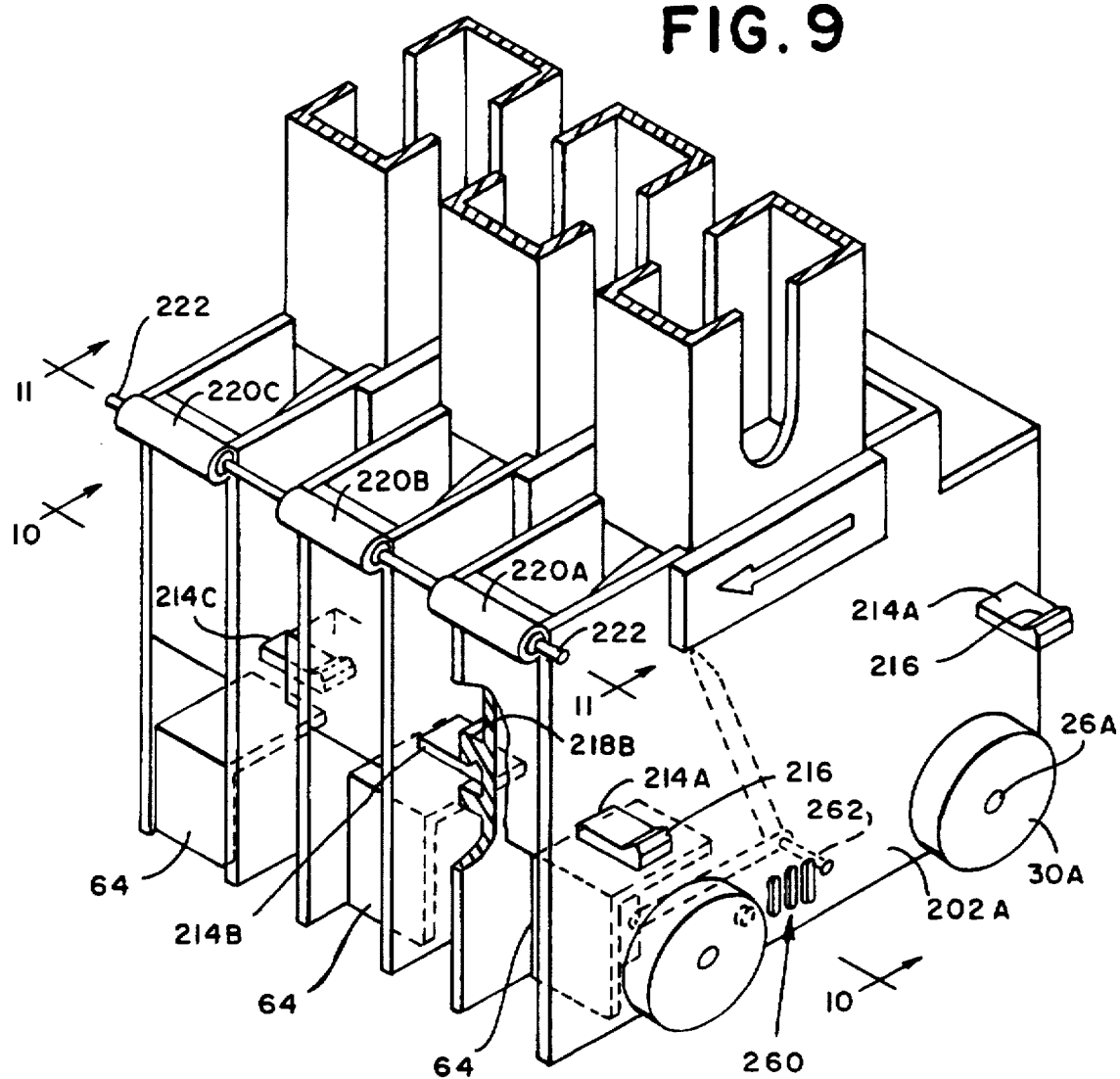
FIG. 9 is a perspective view similar to FIG. 7 showing two other forms of means for connecting the individual article dispensing assemblies together.
Figure 10:
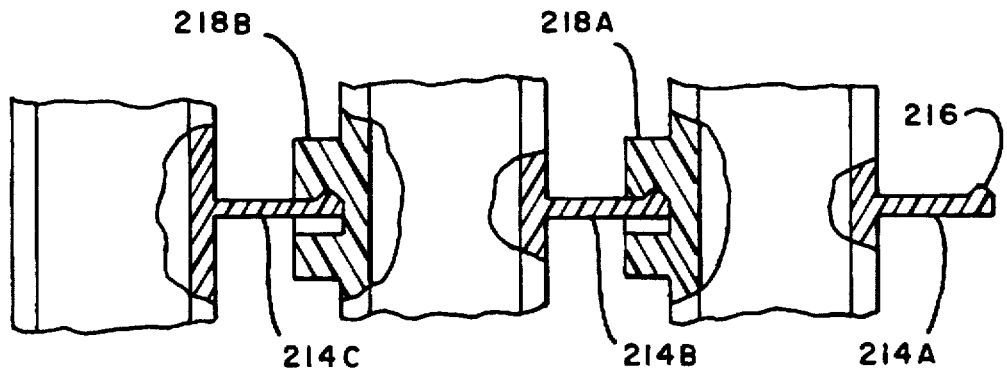
FIG. 10 is a sectional view taken on the line 10—10 of FIG. 9.

FIGS. 9 and 10 illustrate another variation of the means for removably securing the dispensing assemblies together in which the latching clip 208 is replaced by a plurality of latching fingers 214A, 214B and 214C which project laterally outwardly from one side wall 202A, 202B and 202C of each of the article dispensing assemblies 200A, 200B and 200C. Each latching finger 214A, 214B and 214C terminates in a hook portion 216 which fits into a suitable receptor means formed on the opposite side wall of each dispensing assembly, such as the protrusion 218 which has a recess 219 suitably formed to receive the hook portion 216. It will be seen that the hook portion 216 of each latching finger 214A, 214B and 214C is slightly chamfered on both sides to facilitate easy insertion and removal of the latching fingers 214A, 214B and 214C from the recesses 218.

Figure 11:
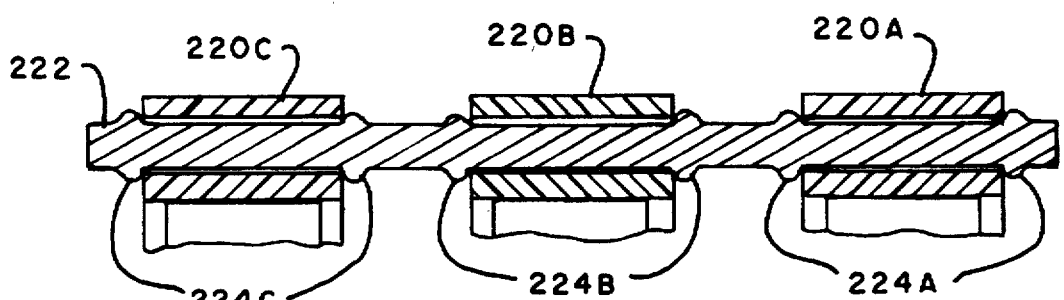
FIG. 11 is a sectional view of the connecting rod used with one of the forms of connecting means shown in FIG. 9.

FIGS. 9 and 11 illustrate still another variation for removably securing the article dispensing assemblies together, it being understood that two different variations are shown in FIG. 9 to avoid further duplication of the figure, and that only one variation would be utilized at a time in actual practice. Thus, as best seen in FIG. 9, each dispensing assembly 200A, 200B and 200C has a suitable form of tubular projection 220A, 220B and 220C mounted on a portion of at least one, and preferably both, of the end walls 204A, 204B and 204C respectively, the location of the tubular projections being a matter of preference although in the drawing it is shown at the upper edge of the end walls 204A, 204B and 204C to facilitate handling while connecting the dispensing assemblies together. The length of the tubular projections is substantially equal to the outside width of the dispensing assemblies. An elongate rod 222 extends through the projections to secure the individual dispensing assemblies together. As best seen in FIG. 11, the rod 222 has a diameter that is slightly smaller than the internal diameter of the tubular projections so that the rod 222 can pass freely through the tubular projections. The rod 222 also has a plurality of pairs of annular ridges 224A, 224B and 224C which project radially outwardly from the periphery of the rod 222 far enough to have a diameter that is very slightly larger than the internal diameter of the tubular projections, so as to present a substantially firm press fit therewith. The pairs of annular ridges 224A, 224B and 224C are spaced apart on the rod 222 by a distance substantially equal to the space between adjacent dispensing assemblies, and the annular ridges of each pair are spaced apart by a distance substantially equal to the length of the tubular projections.

Thus, to connect the dispensing assemblies 200A, 200B and 200C together, the rod 222 is inserted into the tubular projection of one of the dispensing assemblies and is pushed therethrough until the tubular projection of that dispensing assembly is disposed in the center position on the rod 222. Additional dispensing assemblies are then added to each end of the rod 222 until all three are mounted thereon as seen in FIGS. 9 and 11. It will be apparent that during this assembly procedure, the ridges 224 passing through the tubular projections will have a very snug press fit therein, so that when the rod 222 has been inserted through the projections the ridges 224 will maintain the dispensing assemblies in the desired spaced apart relationship as seen in FIG. 9, and will securely hold the dispensing assemblies in this relationship due to the pressure of the ridges 224 on the opposite ends of the tubular projections.

In addition to the previously described variations for removably securing a plurality of article dispensing assemblies together, this embodiment of the invention also includes means for operatively interconnecting the actuator means in each dispensing assembly so as to maintain the operation of all of the actuator means in each of the dispensing assemblies in the predetermined phase relationship to maintain, in turn, the operation of the ejector means therein in the same out of phase relationship as was accomplished in the previous embodiment in which the plurality of article dispensing assemblies were non removably incorporated into a single housing. Here, again, the phase relationship of the article dispensing assemblies is dependent on the number of dispensing assemblies utilized in a composite unit, and as with the previous embodiment, is 180° for two dispensing assemblies, 120° for three dispensing assemblies and 90° for four dispensing assemblies.

Figure 12:
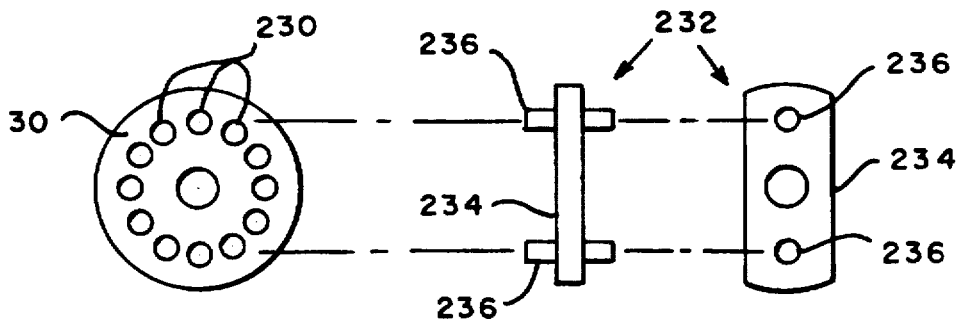
FIG. 12 is an exploded view of one form of means for transferring drive from one article dispensing assembly to another in a particular phase relationship.
Figure 13:
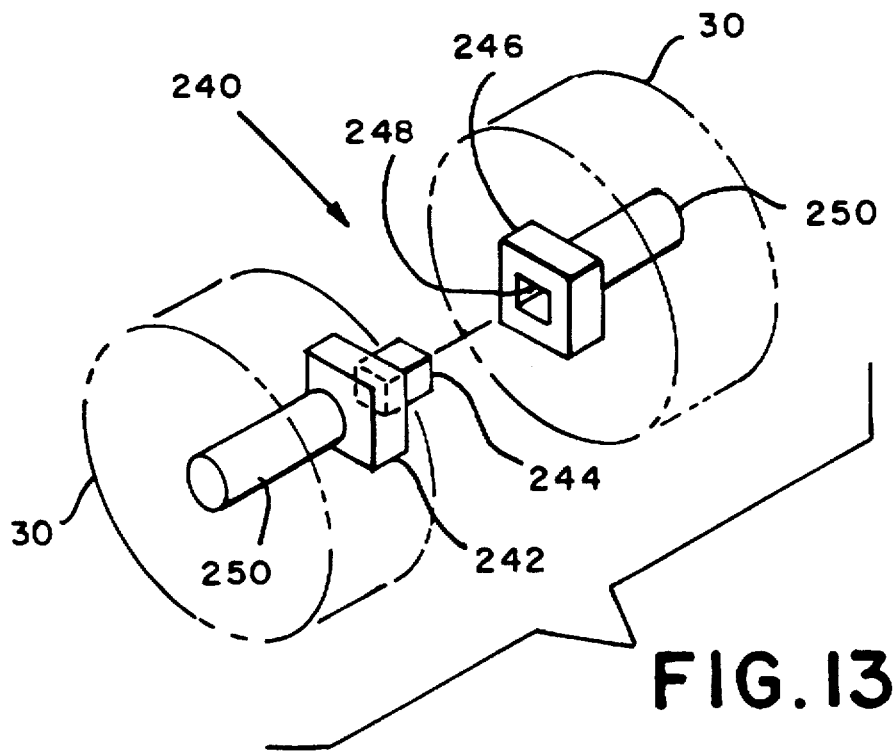
FIG. 13 is an exploded view of another form of means for transferring drive from one article dispensing assembly to another in a particular phase relationship.
Figure 14:
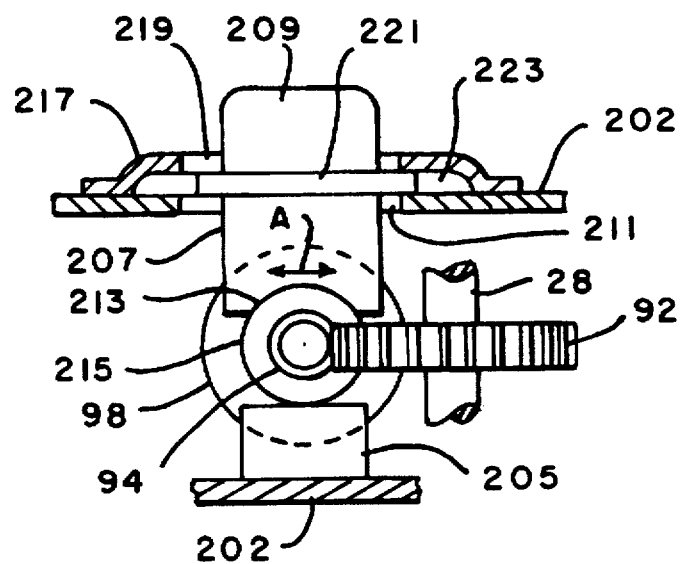
FIG. 14 is a fragmentary view of the motorized actuator means of one dispensing assembly showing one means for disengaging the motor drive from the actuator means.

There are a number of ways of accomplishing this interconnection, three of which are shown in FIGS. 12 through 14. In the arrangement shown in FIG. 12, the driving wheels 30 of each article dispensing assembly are each provided with a plurality of apertures 230 arranged in a circle in spaced relationship with the outer periphery of the wheel and spaced apart angularly by 30°. A connector, indicated generally by the reference numeral 232, includes an elongate body member 234 having a pair of pins 236 mounted thereon which project axially outwardly from the body member 234 on opposite sides thereof. The pins 236 are spaced apart the same distance as the radial distance between opposite apertures 230 so that the connector 232 can be mounted on the wheel 30 by inserting the pins 236 into a pair of oppositely disposed apertures 230, in which they are retained either merely by a press fit or other suitable securing means.

It will be apparent that if it is desired to connect two dispensing assemblies together, with the actuator means of each being 180° out of phase, the wheels 30 of each dispensing assembly are rotated until the ejector means of each dispensing assembly are in opposite extreme positions, i.e., the rear wall 62 is in the forward most position in one dispensing assembly and is in the rearward most position in the other dispensing assembly. When this adjustment has been made, the connector 232 is attached to the driving wheels 30 of each dispensing assembly by pressing the pins 236 into any pair of opposite apertures 230, with the result that when a motorized dispensing assembly is connected to a non-motorized dispensing assembly and the motor is energized, the actuator means and the ejector means of both dispensing assemblies will continue to operate in the same out of phase relationship as that for which the initial adjustment was made.

Similarly, if it is desired to connect three dispensing assemblies together, as shown in the drawings, the ejector means of all three dispensing assemblies are adjusted in the manner described above, except that the rear wall 62 of the middle dispensing assembly is set at an intermediate position, as seen in FIGS. 8 and 9, so that the three ejector means are now set to operate in an out of phase relationship that is 120° apart for each dispensing assembly. A connector 232 is again secured to the adjacent driving wheels of two adjacent dispensing assemblies by pressing the pins 236 into any pair of opposite apertures 230 in the wheels, and a second connector is attached to the adjacent driving wheels of one of the already connected dispensing assemblies and the third dispensing assembly. It will be recognized that in this situation, the two pairs of adjacent driving wheels will be disposed 120° apart from each other, thereby maintaining the same out of phase relationship between the actuator means as was adjusted for the wheels so that the actuator means and the ejector means of all three dispensing assemblies will continue to operate in the same out of phase relationship as that for which the initial adjustment was made.

Finally, if it is desired to connect four dispensing assemblies together, again the ejector means of all four dispensing assemblies are adjusted in the manner described above, except that the rear wall 62 of the two middle dispensing assemblies are set at intermediate positions so that the four ejector means are now set to operate in an out of phase relationship that is 90° apart for each dispensing assembly. In the same manner as with three dispensing assemblies, the connectors 232 can be secured to adjacent driving wheels so that all of the adjacent driving wheels of the four dispensing assemblies are oriented 90° out of phase, thereby maintaining the same out of phase relationship between the actuator means as was adjusted for the wheels with the same result as stated above for connecting three dispensing assemblies.

FIG. 13 illustrates another way of accomplishing the interconnection between adjacent dispensing assemblies to maintain a predetermined phase relationship in the operation of the respective actuator means. Thus, a different form of connector, indicated generally by the reference numeral 240, comprises a male body portion 242 having a square stud 244 projecting outwardly from one end thereof. A female body portion 246 has a similarly shaped square recess 248 formed in one end thereof which removably receives the stud 244 when the two body portions 242 and 246 are joined together. Both body portions having cylindrical or other suitably shaped studs 250 which are removably inserted into similarly shaped apertures in the wheels 30. Thus, it will be apparent that the operational phase relationship between the actuator means of adjacent dispensing assemblies can be changed either by 180° or by 90° merely by changing the orientation of the connection between the body portions 242 and 246.

In order to adjust the phase relationship by 120°, a second connector 240 is provided which is identical to that shown in FIG. 13 with the exception that both the stud 244 and the recess 248 are triangular in shape rather than square, so that one wheel 30 can be adjusted relative to the other in increments of 120°.

It would, of course, be possible to make body portions 242 and 246 integral with the wheels rather than as separable and interchangeable members, but this would require that the driving wheels 30 be removed from the axles 26 in each dispensing assembly 200 in order to change the phase relationship as described above.

The second embodiment of the invention preferably includes a feature for providing a visual indication of how each of the dispensing assemblies in a composite unit is set so that all of the dispensing assemblies can be set to operate in the desired predetermined phase relationship without resorting to guess work. With reference to FIGS. 7–9, it will be seen that a plurality of indicator marks, generally indicated by the reference numeral 260, are provided on one side wall 202 of each of the dispensing assemblies 200A, 200B and 200C, adjacent the lower edge of the side walls. A pin 262 (FIGS. 7 and 9) is mounted in each of the dispensing assemblies 200A, 200B and 200C, as indicated by the reference number 262A, 262B and 262C (FIG. 8). The pins 262 are mounted on the forward end 69 of the ejector arm 68, either independently or coaxially with the pin 70, so that each pin 262 for moves forwardly and rearwardly with the arm 68 in the manner fully described above. Since the walls of the dispensing assemblies are typically made of transparent plastic, the position of the pins 262 in relation to the marks 260 can be clearly observed. The marks 260 can be of any desired configuration, but as shown the intermediate marks are elongate to accommodate the orbital movement of the pin 262 caused by rotation of the disc 72 to which the forward end of the actuator arm 68 is attached.

The pin 262 and marks 260 are utilized in the following manner. If it is desired to connect two dispensing assemblies together with the ejector 64 of each assembly disposed 180° apart, they are adjusted to that the pin 262 of one dispensing assembly is aligned with the forward most mark, as seen in the dispensing assembly 200A in FIG. 8, and the pin 262 of the other dispensing assembly is aligned with the rearward most mark, as seen in the dispensing assembly 200C in FIG. 8. When these two dispensing assemblies are joined together, the predetermined phase relationship of the actuator means and the ejector means of the two assemblies will be 180° apart.

Similarly, if it is desired to connect three dispensing assemblies together with the actuator means and ejector means of each assembly disposed 120° apart, they are adjusted the same as described above with respect to two of the dispensing assemblies, i.e., one with the pin 262 aligned with the forward most mark 260 and another with the pin 262 aligned with the rearward most mark, but the pin 262 of the third dispensing assembly would be aligned with the middle mark 260, as seen in the dispensing assembly 200B in FIG. 8, thereby disposing the actuator means 66 and the ejector means 60 of the three dispensing assemblies 120° apart, again as seen in FIG. 8.

If it is desired to connect four dispensing assemblies together, the same procedure as described above would be followed, except that two of the dispensing assemblies would be adjusted so that the pin 262 of one would be aligned with the upper or lower portion of the forward most long marker 260, and the pin 262 of the other dispensing assembly would be aligned with opposite vertical location of the rearward most long marker, thereby setting the predetermined phase relationship of the actuator means and the ejector means of all four dispensing assemblies 90° apart.

In order to make the above adjustments without forcing any of the operating parts of the dispensing assemblies to avoid breakage, all but one of the dispensing assemblies 200 to be joined together must be non-powered so that the operating parts can be freely moved, and adjusted as desired relative to the powered unit which can only be adjusted in a given position by momentarily operating the motor 98. However, as previously mentioned, it is within the principles of the invention that multiple powered dispensing assemblies may be joined together in the event that a user wishes to purchase more than one powered dispensing assembly and use them together. This is accomplished by providing means for disengaging the motor 98 from the actuator means 206 of the powered dispensing assemblies, thereby converting the dispensing assembly from a powered mode to a non-powered mode. This can be accomplished either by moving the motor 98 so as to disengage the worm gear 94 from the gear 92, or by moving the gear 92 so as to disengage it from the worm gear 94. FIG. 14 illustrates the former, wherein it is seen that the motor 98 is mounted in the dispensing assembly 200 between opposed side walls 202 by means of a fixed plate 203 which pivotally supports the non-driving end of the motor 98, and a pair of internal supporting plates 205 and 207, of which the plate 205 is fixed to one side wall 202 and the plate 207 has a portion 209 which extends through a slot 211 in the side wall 202. The other end of the plate 207 is bifurcated as at 213 to fit around a bearing 215 or other suitable portion of the housing of the motor 98 so as to grip the motor 98 for lateral back and forth movement in the direction of the arrow A. The outer surface of the side wall 202 may be provided with a stabilizing cross member 217 which also has a slot 219 in which the extended portion 209 of the plate 207 sides in the same direction as the arrow A, the extended portion 209 being provided with a cross member 221 which slides back and forth in the space 223 between the inner surface of the cross member 217 and the outer surface of the side wall 202. Thus, as viewed in FIG. 14, when the user pushes the extended portion 209 of the plate 207 toward the left, the plate 207 pivots the motor 98 to the left just enough to disengage the teeth of the worm gear 94 from the gear 92 to disengage the drive between the worm gear 92 and the gear 92, thereby changing the dispensing assembly into a non-powered mode. Moving the extended portion 209 of the plate 207 in the opposite direction reengages the teeth of the worm gear 94 with the teeth of the gear 92 to reestablish the drive between the worm gear 94 and the gear 92, thereby changing the dispensing assembly back into a powered mode.

The other method of disengaging the drive from the motor 98 to the gear 92, i.e., by moving the gear 92 relative to a stationary motor 98, is illustrated in FIG. 8, and is shown in conjunction with the dispensing assembly 200B. Thus, it is seen that the gear 92 is engaged on opposite sides by a bifurcated slider 93 which suitably mounted in the end wall 204B for lateral back and forth movement in the direction of the arrow B by a suitable extension 95 which projects beyond the end wall 204B. The gear 92 is suitably mounted on a stub shaft for movement with the slider 93 so that when the slider is moved from the position shown in FIG. 8 toward the adjacent side wall 202B, the gear 92 is moved sufficiently far from the worm gear 94 that the teeth of the gear 92 are disengaged from the teeth of the worm gear 94, with the same result as described above. Movement of the gear 92 in the opposite direction reengages the teeth of the gear 92 with the teeth of the worm gear 94 to reestablish the drive from the worm gear 94 to the gear 92, again with the same result as described above.

It is to be understood that the present invention is not to be considered as limited to the specific embodiments described above and shown in the accompanying drawings, which are merely illustrative of the best modes presently contemplated for carrying out the invention and which are susceptible to such changes as may be obvious to one skilled in the art, but rather that the invention is intended to cover all such variations, modifications and equivalents thereof as may be deemed to be within the scope of the claims appended hereto.

I claim:

1. An article dispensing and positioning device for placing a plurality of rectangular articles such as dominos or the like on a flat surface in a plurality of parallel rows and in evenly spaced relationship with each other in each row, said device comprising:

A a plurality of article dispensing assemblies, each of said dispensing assemblies including
  1 means therein for holding an article to be dispensed therein,
  2 ejector means mounted in said dispensing assembly for cyclical reciprocative movement therein, and
  3 actuator means in said dispensing assembly for causing said cyclical reciprocative movement of said ejector means to eject an article from said dispensing assembly with each cycle of operation of said ejector means, said actuator means of each of said dispensing assemblies being adjusted to operate in a predetermined phase relationship with each other actuator means in which the individual cycles of operation of each of said ejector means are uniformly out of phase with each other ejector means, B means operatively associated with said dispensing assemblies for securing said dispensing assemblies together to form a composite unit, said composite unit including means for supporting said composite unit for movement along said flat surface on which the articles are to be placed, and C means operatively interconnecting all said dispensing assemblies for maintaining the operation of all of said actuator means in said predetermined phase relationship to maintain the operation of all said ejector means in said uniformly out of phase relationship with each other, whereby variations in the force required to operate said article dispensing and positioning device resulting from resistance to movement of the operating parts of said article dispensing assemblies are substantially reduced or eliminated.

2. An article dispensing and positioning device as set forth in claim 1 wherein said composite unit includes two article dispensing assemblies, and said predetermined phase relationship of operation of said actuator means is adjusted to maintain the operation of said ejector means to be 180° out of phase.

3. An article dispensing and positioning device as set forth in claim 1 wherein said composite unit includes three article dispensing assemblies, and said predetermined phase relationship of operation of said actuator means is adjusted to maintain the operation of said ejector means to be 120° out of phase.

4. An article dispensing and positioning device as set forth in claim 1 wherein said composite unit includes four article dispensing assemblies, and said predetermined phase relationship of operation of said actuator means is adjusted to maintain the operation of said ejector means to be 90° out of phase.

5. An article dispensing and positioning device as set forth in claim 1 wherein said means for securing said dispensing assemblies together to form said composite unit comprises a plurality of opposed side and end walls defining a generally rectangular and upstanding housing, said dispensing assemblies being mounted in said housing in side by side relationship with each other so that a plurality of parallel rows of evenly spaced articles are set up as said article dispensing and positioning device moves across said surface.

6. An article dispensing and positioning device as set forth in claim 5 wherein said means operatively interconnecting all said dispensing assemblies to maintain said predetermined phase relationship operation comprises means operatively interconnected between said actuator means of all said dispensing assemblies.

7. An article dispensing and positioning device as set forth in claim 6 wherein said means operatively interconnected between said actuator means of all said dispensing assemblies comprises a shaft extending through said housing, said actuator means in each of said dispensing assemblies being operatively connected to said shaft so as to be operated thereby.

8. An article dispensing and positioning device as set forth in claim 7 wherein said means for supporting said composite unit for movement comprises wheels mounted adjacent opposite ends of said housing, at least one end pair of said wheels being connected to said shaft for rotation therewith.

9. An article dispensing and positioning device as set forth in claim 7 wherein said device further includes power means mounted in said housing and operatively connected to said actuator means of one of said dispensing assemblies for operating said actuator means thereof.

10. An article dispensing and positioning device as set forth in claim 9 wherein said power means is operatively connected to said shaft in said one dispensing assembly so that said power means drives said shaft to propel said article dispensing and positioning device along said flat surface and also to cause operation of all of said actuator means.

11. An article dispensing and positioning device as set forth in claim 10 wherein said actuator means includes gear means operatively interconnected between said shaft and said ejector means of each of said dispensing assemblies for operating said ejector means in all of said other dispensing assemblies in said successive cycles of reciprocative movement in said predetermined phase relationship in response to rotation of said shaft.

12. An article dispensing and positioning device as set forth in claim 5 wherein said means operatively interconnecting said dispensing assemblies to maintain said predetermined phase relationship operation comprises a pair of shafts extending through said housing, said actuator means in each of said dispensing assemblies being operatively connected to one of said shafts so as to be operated thereby to maintain the operation of all of said ejector means in said uniformly out of phase relationship.

13. An article dispensing and positioning device as set forth in claim 12 wherein said means for supporting said composite unit for movement comprises wheels mounted adjacent opposite ends of said housing, at least one end pair of said wheels being connected to said other shaft for rotation therewith.

14. An article dispensing and positioning device as set forth in claim 12 wherein said device includes power means mounted in said housing and operatively connected to said actuator means of one of said article dispensing assemblies for operating said actuator means thereof, said power means being operatively connected to both said shafts in said one article dispensing assembly so that said power means drives said one shaft to cause operation of all of said actuator means and simultaneously drives said other shaft to rotate said wheels connected thereto to propel said article dispensing and positioning device along said flat surface.

15. An article dispensing and positioning device as set forth in claim 14 wherein said actuator means of all said dispensing assemblies includes gear means operatively interconnected between said one shaft and said ejector means of all said dispensing assemblies for operating said ejector means in all said dispensing assemblies in said successive cycles of reciprocative movement in said predetermined phase relationship in response to rotation of said shaft, and said actuator means in said one dispensing assembly includes gear means operatively interconnected between said actuator means therein and said other shaft to propel said article dispensing and positioning device along said flat surface.

16. An article dispensing and positioning device as set forth in claim 1 wherein said device further includes power means mounted in said housing and operatively connected to said actuator means of one of said dispensing assemblies for operating said actuator means thereof to cause said cyclical reciprocative movement of said ejector means in said one dispensing assembly and for operating said means for supporting said composite unit to propel said composite unit along said flat surface.

17. An article dispensing and positioning device as set forth in claim 16 wherein said means operatively interconnected between said actuator means of all said dispensing assemblies comprises a shaft extending through said housing, said actuator means in each of said dispensing assemblies being operatively connected to said shaft so as to be operated by said power means.

18. An article dispensing and positioning device as set forth in claim 16 wherein said power means is also operatively connected to said means for supporting said composite unit for movement whereby said power means simultaneously operates said actuator means of said one dispensing assembly and also operates said means for supporting said composite unit to move said composite unit along said surface.

19. An article dispensing and positioning device as set forth in claim 17 wherein said means operatively interconnecting said dispensing assemblies to maintain said predetermined phase relationship operation comprises a pair of shafts extending through said housing from one side thereof to the other, said actuator means in each of said dispensing assemblies being operatively connected to one of said shafts so as to be operated thereby to maintain the operation of all of said ejector means in said uniformly out of phase relationship.

20. An article dispensing and positioning device as set forth in claim 19 wherein said power means is operatively connected to said actuator means of one of said article dispensing assemblies for operating said actuator means thereof, said power means being operatively connected to both said shafts in said one dispensing assembly so that said power means drives said one shaft to cause operation of all of said actuator means and simultaneously drives said other shaft to propel said article dispensing and positioning device along said flat surface.

21. An article dispensing and positioning device as set forth in claim 1 wherein said means for securing said dispensing assemblies together to form said composite unit comprises means for removably securing a variable number of said dispensing assemblies together in spaced apart side by side relationship with each other so that a plurality of parallel rows of evenly spaced articles are set up as said article dispensing and positioning device moves across said surface.

22. An article dispensing and positioning device as set forth in claim 21 wherein A each of said dispensing assembles includes a pair of opposed side and end walls defining a generally elongate and upstanding housing, and B said means for removably securing said dispensing assemblies together comprises means for removably engaging a portion of said housing of each dispensing assembly with an adjacent portion of said housing of an adjacent dispensing assembly.

23. An article dispensing and positioning device as set forth in claim 22 wherein said means for removably engaging a portion of said housing of each dispensing assembly comprises A a latching clip having a longitudinal body member and a plurality of pairs of laterally extending latching fingers projecting from said body member, said latching fingers being spaced from each other by the width of said side walls of each dispensing assembly and said pairs of latching fingers being spaced from each other by the space between adjacent side walls of adjacent dispensing assemblies, and B receptor means formed on opposite side walls of each of said dispensing assemblies adjacent at least one of said end walls thereof for receiving said pairs of latching fingers in latching engagement therewith, whereby any number of said dispensing assemblies can be connected together to form said composite unit.

24. An article dispensing and positioning device as set forth in claim 22 wherein said means for removably engaging a portion of said housing of each dispensing assembly comprises A latching means projecting laterally outwardly from one side wall of each of said dispensing assemblies, and B receptor means formed on the opposite side wall of each of said dispensing assemblies for receiving said latching means of an adjacent dispensing assembly in latching engagement therewith, whereby any number of said dispensing assemblies can be connected together to form said composite unit.

25. An article dispensing and positioning device as set forth in claim in claim 22 wherein said means for removably engaging a portion of said housing of each dispensing assembly comprises A elongate tubular means formed on at least one end wall of all of said dispensing assemblies, and B an elongate rod adapted to be inserted through said tubular means of all of said dispensing assemblies, said rod having abutment means thereon for securing said tubular means to said rod in said spaced apart side by side relationship to maintain said dispensing assemblies in said relationship, whereby any number of said dispensing assemblies can be connected together to form said composite unit.

26. An article dispensing and positioning device as set forth in claim 25 wherein said abutment means on said rod projects radially outwardly slightly farther than the inside diameter of said tubular means so that said rod cannot shift axially of said tubular means once it is installed thereon.

27. An article dispensing and positioning device as set forth in claim 21 wherein said means operatively interconnecting all said dispensing assemblies for maintaining said predetermined phase relationship operation comprises means operatively but removably interconnected between said actuator means of all said dispensing assemblies.

28. An article dispensing and positioning device as set forth in claim 27 wherein A said supporting means for said composite unit comprises individual supporting means for each of said plurality of dispensing assemblies, and B said means operatively but removably interconnecting said actuator means in all said dispensing assemblies to operate in said predetermined phase relationship comprises means removably and adjustably interconnecting said supporting means of each of said dispensing assemblies in said predetermined phase relationship.

29. An article dispensing and positioning device as set forth in claim 28 wherein A said supporting means for each of said plurality of dispensing assemblies comprises a plurality of wheels, at least one opposed pair of which has a plurality of outwardly opening and arcuately spaced recesses formed around the axis thereof, and B said means interconnecting said supporting means comprises removable connector means extending between selected recesses on a wheel of one of said dispensing assemblies and selected recesses on the adjacent wheel of an adjacent dispensing assembly, said recesses being selected so as to connect said adjacent wheels together in different relative rotational positions, to maintain said predetermined phase relationship of all said actuator means.

30. An article dispensing and positioning device as set forth in claim 28 wherein said means interconnecting said supporting means comprises a pair of elongate body members adapted to be removably secured to said supporting means, one of said body members having a shaped stud projecting axially therefrom, the other of said body members having a recess shaped to receive said stud of said one body member, the shape of said stud and said recess being such that said body members can be engaged with each other in different relative rotational positions, whereby said supporting means of any number of said dispensing assemblies can be connected together in said different rotational positions to maintain said out of phase relationship of said actuator means of said plurality of dispensing assemblies.

31. An article dispensing and positioning device as set forth in claim 28 wherein said means, interconnecting said supporting means comprises a shaped projection extending axially outwardly from a portion of said supporting means on one side of each of said plurality of dispensing assemblies, and a correspondingly shaped recess formed in a portion of said supporting means on the opposite side of each of said plurality of dispensing assemblies, the shape of said projection and said recess being such that said projection can be engaged with said recess in different relative rotational positions, whereby said supporting means of any number of said dispensing assemblies can be connected together in said different rotational positions to maintain said out of phase relationship of said actuator means of said plurality of dispensing assemblies.

32. An article dispensing and positioning device as set forth in claim 21 wherein each of said article dispensing assemblies includes means for providing a visual indication of the relative position of said ejector means of said article dispensing assemblies to facilitate connecting said article dispensing assemblies together with said ejector means of each article dispensing assembly positioned in the desired uniform out of phase relationship.

33. An article dispensing and positioning device as set forth in claim 32 wherein said visual indicating means comprises a plurality of indicating marks on at least one side wall of said article dispensing assemblies, and index means operatively associated with said ejector means in said article dispensing assemblies for assuming visual alignment with said indicating marks, thereby indicating whether said ejector means is disposed at one end or the other of its reciprocative movement or at some predetermined intermediate point.

34. An article dispensing and positioning device for placing a plurality of rectangular articles such as dominos or the like on a flat surface in evenly spaced relationship, said device comprising:

A an article dispensing assembly having means for holding an article to be dispensed, B ejector means mounted in said dispensing assembly for cyclical reciprocative movement therein, C actuator means in said dispensing assembly for causing said cyclical reciprocative movement of said ejector means to eject an article held therein from said dispensing assembly with each cycle of operation of said ejector means, D power means mounted in said dispensing assembly for operating said actuator means, and E manually operable means for selectively engaging and disengaging said power means from said actuator means to prevent operation of said actuator means regardless of whether or not said power means is operating, whereby said article dispensing and positioning device can be set in a powered mode in which said device can be operated in a selfpropelled, stand along manner, or in a non-powered mode in which said device must be powered from an external source for operation.

35. An article dispensing and positioning device as set forth in claim 34 wherein
- A said power means comprises a motor having an output drive element.
- B said actuator means includes an input drive element engageable with said output drive element of said motor for operating said actuator means, and
- C said means for selectively engaging and disengaging said power means from said actuator means comprises means for selectively engaging and disengaging said output drive element of said motor from said input drive element of said actuator means.

36. An article dispensing and positioning device as set forth in claim 35 wherein said means for selectively engaging and disengaging said output drive element from said input drive element comprises means for causing relative movement between said output and input drive elements for a distance sufficient to engage and disengage said output and input drive elements.

37. An article dispensing and positioning device as set forth in claim 36 wherein said means for causing said relative movement between said output and input drive elements comprises means mounting said motor in said dispensing assembly for limited back and forth movement relative to said input drive element so that movement of said motor toward and away from said input drive element causes said output drive element to engage and disengage with said input drive element.

38. An article dispensing and positioning device as set forth in claim 37 wherein said means mounting said motor for limited back and forth movement includes means accessible from the exterior of said dispensing assembly for manual grasping for moving said motor in said back and forth movement.

39. An article dispensing and positioning device as set forth in claim 36 wherein said means for causing said relative movement between said output and input drive elements comprises means mounting said input drive element for limited back and forth movement relative to said output drive element so that movement of said input drive element toward and away from said output drive element causes said input drive element to engage and disengage with said output drive element.

40. An article dispensing and positioning device as set forth in claim 39 wherein said input drive element comprises a gear mounted on a shaft for rotation therewith, and said means mounting said input drive element for limited back and forth movement relative to said output drive element comprises means for sliding said gear toward and away from said output drive element to engage and disengage said input drive element from said output drive element.

41. An article dispensing and positioning device as set forth in claim 40 wherein said means for sliding said gear includes means accessible from the exterior of said dispensing assembly for manual grasping for moving said gear in said axial direction.

* * * * *